United States Patent
Russell et al.

(10) Patent No.: US 9,786,120 B2
(45) Date of Patent: *Oct. 10, 2017

(54) PLAYER SPECIFIC NETWORK

(71) Applicant: IGT, Las Vegas, NV (US)

(72) Inventors: Glen Keith Russell, North Las Vegas, NV (US); David Hollister, Broomfield, CO (US); Scott Boyd, Las Vegas, NV (US); Richard J. Schneider, Las Vegas, NV (US); R. Jeffrey Jordan, Las Vegas, NV (US); Matt Glazier, Gilbert, AZ (US); Shannon Mason, Las Vegas, NV (US); Kevan Wilkins, Las Vegas, NV (US); Allan Legler, Hartland, WI (US)

(73) Assignee: IGT, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/344,169

(22) Filed: Nov. 4, 2016

(65) Prior Publication Data

US 2017/0076541 A1    Mar. 16, 2017

Related U.S. Application Data

(63) Continuation of application No. 14/551,830, filed on Nov. 24, 2014, now Pat. No. 9,508,224, which is a
(Continued)

(51) Int. Cl.
*G06F 17/00* (2006.01)
*G07F 17/32* (2006.01)
(Continued)

(52) U.S. Cl.
CPC .......... *G07F 17/3225* (2013.01); *A63F 13/12* (2013.01); *G07F 17/32* (2013.01);
(Continued)

(58) Field of Classification Search
None
See application file for complete search history.

(56) References Cited

U.S. PATENT DOCUMENTS

| 2,743,108 A | 4/1956 | Sanders |
| 3,904,207 A | 9/1975 | Gold |

(Continued)

FOREIGN PATENT DOCUMENTS

| EP | 0 449 433 | 10/1991 |
| EP | 0 874 337 | 10/1998 |

(Continued)

OTHER PUBLICATIONS

European Office Action dated Sep. 7, 2006 from corresponding European Application No. 04788767.4.
(Continued)

*Primary Examiner* — Paul A D'Agostino
(74) *Attorney, Agent, or Firm* — Neal, Gerber & Eisenberg LLP

(57) ABSTRACT

Embodiments of the invention allow a player to have a unique gaming experience, different than other players, even when playing on the same network. A game may span several gaming sessions. States of a game, for example a bonus game, may be stored when the player decides to stop playing the game. When the player initiates a next gaming session, at the same or another location, the previous state of the game is re-loaded onto the gaming machine and the player returns to the previous state. Further, additional bonuses can be implemented because the network knows the identity and other information about the player. The additional bonuses may be unique to that player. Messages particular to a player are exchanged between a gaming device and a gaming network.

20 Claims, 15 Drawing Sheets

Related U.S. Application Data continuation of application No. 12/881,126, filed on Sep. 13, 2010, now abandoned, which is a continuation of application No. 10/942,208, filed on Sep. 15, 2004, now abandoned.

(60) Provisional application No. 60/503,516, filed on Sep. 15, 2003.

(51) Int. Cl.
*A63F 13/30* (2014.01)
*H04L 29/06* (2006.01)
*H04L 29/08* (2006.01)

(52) U.S. Cl.
CPC ...... *G07F 17/3211* (2013.01); *G07F 17/3244* (2013.01); *G07F 17/3248* (2013.01); *G07F 17/3255* (2013.01); *H04L 63/0853* (2013.01); *H04L 63/123* (2013.01); *H04L 67/14* (2013.01); *H04L 67/306* (2013.01); *H04L 67/38* (2013.01); *H04L 69/329* (2013.01)

(56) References Cited

U.S. PATENT DOCUMENTS

| | | | |
|---|---|---|---|
| 4,363,485 | A | 12/1982 | Edwall |
| 4,582,324 | A | 4/1986 | Koza et al. |
| 4,618,150 | A | 10/1986 | Kimura |
| 4,652,998 | A | 3/1987 | Koza et al. |
| 4,659,087 | A | 4/1987 | Shen et al. |
| 4,695,053 | A | 9/1987 | Vazquez, Jr. et al. |
| 4,743,022 | A | 5/1988 | Wood |
| 4,760,527 | A | 7/1988 | Sidley |
| 4,775,155 | A | 10/1988 | Lees |
| 4,807,884 | A | 2/1989 | Breeding |
| 4,836,553 | A | 6/1989 | Suttle et al. |
| 4,844,464 | A | 7/1989 | Berge |
| 4,861,041 | A | 8/1989 | Jones et al. |
| 4,926,327 | A | 5/1990 | Sidley |
| 5,019,973 | A | 5/1991 | Wilcox et al. |
| 5,033,744 | A | 7/1991 | Bridgeman et al. |
| 5,087,405 | A | 2/1992 | Maker |
| 5,098,107 | A | 3/1992 | Boylan et al. |
| 5,116,055 | A | 5/1992 | Tracy |
| 5,154,429 | A | 10/1992 | LeVasseur |
| 5,174,579 | A | 12/1992 | Griffiths |
| 5,205,555 | A | 4/1993 | Hamano |
| 5,248,142 | A | 9/1993 | Breeding |
| 5,275,400 | A | 1/1994 | Weingardt et al. |
| 5,275,416 | A | 1/1994 | Schorr |
| 5,280,909 | A | 1/1994 | Tracy |
| 5,288,077 | A | 2/1994 | Jones |
| 5,288,081 | A | 2/1994 | Breeding |
| 5,292,127 | A | 3/1994 | Kelly et al. |
| 5,334,836 | A | 8/1994 | Fila |
| 5,342,047 | A | 8/1994 | Heidel et al. |
| 5,342,049 | A | 8/1994 | Wichinsky et al. |
| 5,344,144 | A | 9/1994 | Canon |
| 5,362,053 | A | 11/1994 | Miller |
| 5,364,105 | A | 11/1994 | Jones |
| 5,377,973 | A | 1/1995 | Jones et al. |
| 5,377,993 | A | 1/1995 | Josephs |
| 5,390,934 | A | 2/1995 | Grassa |
| 5,393,057 | A | 2/1995 | Marnell, II |
| 5,393,067 | A | 2/1995 | Paulsen et al. |
| 5,407,200 | A | 4/1995 | Zalabak |
| 5,411,271 | A | 5/1995 | Mirando |
| 5,417,430 | A | 5/1995 | Breeding |
| 5,431,407 | A | 7/1995 | Hofberg et al. |
| 5,452,899 | A | 9/1995 | Skratulia et al. |
| 5,454,570 | A | 10/1995 | Karai |
| 5,476,259 | A | 12/1995 | Weingardt |
| 5,489,101 | A | 2/1996 | Moody |
| 5,494,296 | A | 2/1996 | Grassa |
| 5,529,309 | A | 6/1996 | Bartlett |
| 5,531,440 | A | 7/1996 | Dabrowski et al. |
| 5,536,016 | A | 7/1996 | Thompson |
| 5,542,669 | A | 8/1996 | Charron et al. |
| 5,560,603 | A | 10/1996 | Seelig et al. |
| 5,570,885 | A | 11/1996 | Orstein |
| 5,577,731 | A | 11/1996 | Jones |
| 5,584,485 | A | 12/1996 | Jones et al. |
| 5,584,763 | A | 12/1996 | Kelly et al. |
| 5,597,162 | A | 1/1997 | Franklin |
| 5,611,730 | A | 3/1997 | Weiss |
| 5,615,888 | A | 4/1997 | Lofink et al. |
| 5,626,341 | A | 5/1997 | Jones et al. |
| 5,632,485 | A | 5/1997 | Woodland et al. |
| 5,639,088 | A | 6/1997 | Schneider et al. |
| 5,639,089 | A | 6/1997 | Matsumoto et al. |
| 5,641,730 | A | 6/1997 | Brown |
| 5,645,486 | A | 7/1997 | Nagao et al. |
| 5,649,705 | A | 7/1997 | String |
| 5,651,548 | A | 7/1997 | French et al. |
| 5,660,391 | A | 8/1997 | Klasee |
| 5,660,393 | A | 8/1997 | Dreger |
| 5,664,781 | A | 9/1997 | Feola |
| 5,673,917 | A | 10/1997 | Vancura |
| 5,678,821 | A | 10/1997 | Hedman |
| 5,685,774 | A | 11/1997 | Webb |
| 5,707,287 | A | 1/1998 | McCrea, Jr. |
| 5,718,430 | A | 2/1998 | Aramapakul et al. |
| 5,720,483 | A | 2/1998 | Trinh |
| 5,735,742 | A | 4/1998 | French |
| 5,743,523 | A | 4/1998 | Kelly et al. |
| 5,755,619 | A | 5/1998 | Matsumoto et al. |
| 5,766,076 | A | 6/1998 | Pease et al. |
| 5,769,716 | A | 6/1998 | Saffari et al. |
| 5,772,506 | A | 6/1998 | Marks et al. |
| 5,781,647 | A | 7/1998 | Fishbine et al. |
| 5,788,573 | A | 8/1998 | Baerlocher et al. |
| 5,788,574 | A | 8/1998 | Ornstein et al. |
| 5,794,964 | A | 8/1998 | Jones et al. |
| 5,795,225 | A | 8/1998 | Jones et al. |
| 5,806,846 | A | 9/1998 | Lofink et al. |
| 5,816,575 | A | 10/1998 | Keller |
| 5,816,918 | A | 10/1998 | Kelly et al. |
| 5,823,873 | A | 10/1998 | Moody |
| 5,823,874 | A | 10/1998 | Adams |
| 5,830,063 | A | 11/1998 | Byrne |
| 5,833,536 | A | 11/1998 | Davids et al. |
| 5,833,537 | A | 11/1998 | Barrie |
| 5,836,817 | A | 11/1998 | Acres et al. |
| 5,839,730 | A | 11/1998 | Pike |
| 5,845,906 | A | 12/1998 | Wirth |
| 5,848,932 | A | 12/1998 | Adams |
| 5,851,011 | A | 12/1998 | Lott |
| 5,851,148 | A | 12/1998 | Brune et al. |
| 5,855,515 | A | 1/1999 | Pease et al. |
| 5,857,678 | A | 1/1999 | Coleman et al. |
| 5,863,041 | A | 1/1999 | Boylan et al. |
| 5,873,781 | A | 2/1999 | Keane |
| 5,882,261 | A | 3/1999 | Adams |
| 5,890,962 | A | 4/1999 | Takemoto |
| 5,893,718 | A | 4/1999 | O'Donnell |
| 5,911,418 | A | 6/1999 | Adams |
| 5,911,419 | A | 6/1999 | Delaney et al. |
| 5,911,626 | A | 6/1999 | McCrea, Jr. |
| 5,927,714 | A | 7/1999 | Kaplan |
| 5,935,002 | A | 8/1999 | Falciglia |
| 5,941,769 | A | 8/1999 | Order |
| 5,947,820 | A | 9/1999 | Morro et al. |
| 5,947,822 | A | 9/1999 | Weiss |
| 5,951,397 | A | 9/1999 | Dickinson |
| 5,957,776 | A | 9/1999 | Hoehne |
| 5,967,894 | A | 10/1999 | Kinoshita et al. |
| 5,976,016 | A | 11/1999 | Moody et al. |
| 5,978,770 | A | 11/1999 | Waytena et al. |
| 5,980,384 | A | 11/1999 | Barrie |
| 5,984,310 | A | 11/1999 | English |
| 5,984,779 | A | 11/1999 | Bridgeman et al. |
| 5,997,401 | A | 12/1999 | Crawford |
| 6,007,066 | A | 12/1999 | Moody |
| 6,012,719 | A | 1/2000 | Webb |

(56) References Cited

U.S. PATENT DOCUMENTS

| | | |
|---|---|---|
| 6,015,346 A | 1/2000 | Bennett |
| 6,019,369 A | 2/2000 | Nakagawa et al. |
| 6,039,650 A | 3/2000 | Hill |
| 6,047,963 A | 4/2000 | Pierce et al. |
| 6,050,895 A | 4/2000 | Luciano, Jr. et al. |
| 6,056,641 A | 5/2000 | Webb |
| 6,056,642 A | 5/2000 | Bennett |
| 6,059,289 A | 5/2000 | Vancura |
| 6,059,658 A | 5/2000 | Mangano et al. |
| 6,062,981 A | 5/2000 | Luciano, Jr. |
| 6,089,978 A | 7/2000 | Adams |
| 6,093,102 A | 7/2000 | Bennett |
| 6,095,525 A | 8/2000 | Terminel |
| 6,102,400 A | 8/2000 | Scott et al. |
| 6,102,798 A | 8/2000 | Bennett |
| 6,110,039 A | 8/2000 | Oh |
| 6,110,041 A | 8/2000 | Walker et al. |
| 6,110,043 A | 8/2000 | Olsen |
| 6,117,012 A | 9/2000 | McCrea, Jr. |
| 6,120,031 A | 9/2000 | Adams |
| 6,120,377 A | 9/2000 | McGinnis, Sr. et al. |
| 6,126,541 A | 10/2000 | Fuchs |
| 6,126,542 A | 10/2000 | Fier |
| 6,126,547 A | 10/2000 | Ishimoto |
| 6,131,908 A | 10/2000 | Palmer |
| 6,135,884 A | 10/2000 | Hedrick et al. |
| 6,135,885 A | 10/2000 | Lermusiaux |
| 6,139,013 A | 10/2000 | Pierce et al. |
| 6,142,873 A | 11/2000 | Weiss et al. |
| 6,142,874 A | 11/2000 | Kodachi et al. |
| 6,146,273 A | 11/2000 | Olsen |
| 6,155,925 A | 12/2000 | Giobbi et al. |
| 6,159,095 A | 12/2000 | Frohm et al. |
| 6,159,096 A | 12/2000 | Yoseloff |
| 6,159,097 A | 12/2000 | Gura |
| 6,159,098 A | 12/2000 | Slomiany et al. |
| 6,165,069 A | 12/2000 | Sines et al. |
| 6,165,070 A | 12/2000 | Nolte et al. |
| 6,165,071 A | 12/2000 | Weiss |
| 6,174,233 B1 | 1/2001 | Sunaga et al. |
| 6,174,235 B1 | 1/2001 | Walker et al. |
| 6,179,291 B1 | 1/2001 | Vancura |
| 6,186,894 B1 | 2/2001 | Mayeroff |
| 6,190,255 B1 | 2/2001 | Thomas et al. |
| 6,203,010 B1 | 3/2001 | Jorasch et al. |
| 6,210,279 B1 | 4/2001 | Dickinson |
| 6,220,593 B1 | 4/2001 | Pierce et al. |
| 6,220,961 B1 | 4/2001 | Keane et al. |
| 6,224,482 B1 | 5/2001 | Bennett |
| 6,224,484 B1 | 5/2001 | Okuda et al. |
| 6,227,969 B1 | 5/2001 | Yoseloff |
| 6,231,442 B1 | 5/2001 | Mayeroff |
| 6,231,445 B1 | 5/2001 | Acres |
| 6,234,897 B1 | 5/2001 | Frohm et al. |
| 6,237,917 B1 | 5/2001 | Timpano |
| 6,238,288 B1 | 5/2001 | Walker et al. |
| 6,261,177 B1 | 7/2001 | Bennett |
| 6,264,560 B1 | 7/2001 | Goldberg et al. |
| 6,267,669 B1 | 7/2001 | Luciano, Jr. et al. |
| 6,270,409 B1 | 8/2001 | Shuster |
| 6,270,412 B1 | 8/2001 | Crawford et al. |
| 6,293,866 B1 | 9/2001 | Walker et al. |
| 6,299,536 B1 | 10/2001 | Hill |
| 6,305,686 B1 | 10/2001 | Perrie et al. |
| 6,309,298 B1 | 10/2001 | Gerow |
| 6,309,299 B1 | 10/2001 | Weiss |
| 6,312,330 B1 | 11/2001 | Jones et al. |
| 6,312,332 B1 | 11/2001 | Walker et al. |
| 6,312,334 B1 | 11/2001 | Yoseloff |
| 6,313,871 B1 | 11/2001 | Schubert |
| 6,319,125 B1 | 11/2001 | Acres |
| 6,322,451 B1 | 11/2001 | Miura |
| 6,334,814 B1 | 1/2002 | Adams |
| 6,336,859 B2 | 1/2002 | Jones et al. |
| 6,336,862 B1 | 1/2002 | Byrne |
| 6,345,824 B1 | 2/2002 | Selitzky |
| 6,346,044 B1 | 2/2002 | McCrea, Jr. |
| 6,347,996 B1 | 2/2002 | Gilmore et al. |
| 6,371,867 B1 | 4/2002 | Webb |
| 6,375,189 B1 | 4/2002 | Jones |
| 6,375,567 B1 | 4/2002 | Acres |
| 6,386,977 B1 | 5/2002 | Hole |
| 6,398,644 B1 | 6/2002 | Perrie et al. |
| 6,402,147 B1 | 6/2002 | Lo |
| 6,416,409 B1 | 7/2002 | Jordan |
| 6,419,583 B1 | 7/2002 | Crumby et al. |
| 6,425,823 B1 | 7/2002 | Byrne |
| 6,428,412 B1 | 8/2002 | Anderson et al. |
| 6,435,511 B1 | 8/2002 | Vancura et al. |
| 6,443,837 B1 | 9/2002 | Jaffe et al. |
| 6,454,648 B1 | 9/2002 | Kelly et al. |
| 6,460,848 B1 | 10/2002 | Soltys et al. |
| 6,461,240 B1 | 10/2002 | Perkins |
| 6,461,241 B1 | 10/2002 | Webb et al. |
| 6,464,582 B1 | 10/2002 | Baerlocher et al. |
| 6,471,591 B1 | 10/2002 | Crumby |
| 6,474,646 B1 | 11/2002 | Webb |
| 6,475,088 B1 | 11/2002 | Jones et al. |
| 6,481,713 B2 | 11/2002 | Perrie et al. |
| 6,482,089 B2 | 11/2002 | Demar et al. |
| 6,485,368 B2 | 11/2002 | Jones et al. |
| 6,503,145 B1 | 1/2003 | Webb |
| 6,514,140 B1 | 2/2003 | Storch |
| 6,517,073 B1 | 2/2003 | Vancura |
| 6,517,435 B2 | 2/2003 | Soltys et al. |
| 6,523,831 B2 | 2/2003 | Webb |
| 6,530,837 B2 | 3/2003 | Soltys et al. |
| 6,532,291 B1 | 3/2003 | McGrath |
| 6,533,276 B2 | 3/2003 | Soltys et al. |
| 6,533,658 B1 | 3/2003 | Walker et al. |
| 6,533,662 B2 | 3/2003 | Soltys et al. |
| 6,537,150 B1 | 3/2003 | Luciano et al. |
| 6,547,242 B1 | 4/2003 | Sugiyama et al. |
| 6,553,276 B2 | 4/2003 | Akram et al. |
| 6,565,434 B1 * | 5/2003 | Acres ................... G07F 17/32 463/25 |
| 6,569,015 B1 | 5/2003 | Baerlocher et al. |
| 6,572,471 B1 | 6/2003 | Bennett |
| 6,579,180 B2 | 6/2003 | Soltys et al. |
| 6,592,457 B1 | 7/2003 | Frohm et al. |
| 6,607,195 B2 | 8/2003 | Vancura |
| 6,609,711 B1 | 8/2003 | Campbell |
| 6,620,046 B2 | 9/2003 | Rowe |
| 6,626,757 B2 | 9/2003 | Oliveras |
| 6,645,073 B2 | 11/2003 | Lemay et al. |
| 6,648,759 B2 | 11/2003 | Vancura |
| 6,652,378 B2 | 11/2003 | Cannon et al. |
| 6,656,040 B1 | 12/2003 | Brosnan et al. |
| 6,656,047 B1 | 12/2003 | Tarantino et al. |
| 6,682,419 B2 | 1/2004 | Webb et al. |
| 6,682,420 B2 | 1/2004 | Webb et al. |
| 6,685,563 B1 * | 2/2004 | Meekins ................ G07F 17/32 273/138.2 |
| 6,692,003 B2 | 2/2004 | Potter et al. |
| 6,692,355 B2 | 2/2004 | Baerlocher et al. |
| 6,702,289 B1 | 3/2004 | Feola |
| 6,726,427 B2 | 4/2004 | Jarvis et al. |
| 6,733,389 B2 | 5/2004 | Webb et al. |
| 6,749,200 B2 | 6/2004 | Yurkins |
| 6,758,751 B2 | 7/2004 | Soltys et al. |
| 6,772,975 B2 | 8/2004 | Sommerfeld et al. |
| 6,776,415 B2 | 8/2004 | Robinson et al. |
| 6,789,800 B2 | 9/2004 | Webb |
| 6,802,773 B2 | 10/2004 | Moody |
| 6,808,173 B2 | 10/2004 | Snow |
| 6,811,486 B1 | 11/2004 | Luciano, Jr. |
| 6,840,517 B2 | 1/2005 | Snow et al. |
| 6,840,860 B1 * | 1/2005 | Okuniewicz ............. G06F 3/16 273/142 B |
| 6,845,981 B1 | 1/2005 | Ko |
| 6,848,994 B1 | 2/2005 | Knust et al. |
| 6,857,958 B2 | 2/2005 | Osawa |
| 6,869,074 B2 | 3/2005 | Miller |
| 6,869,075 B1 | 3/2005 | Stavinsky |

(56) References Cited

U.S. PATENT DOCUMENTS

| | | |
|---|---|---|
| 6,874,786 B2 | 4/2005 | Bruno et al. |
| 6,877,748 B1 | 4/2005 | Patroni et al. |
| 6,878,064 B2 | 4/2005 | Huang |
| 6,884,168 B2 | 4/2005 | Wood et al. |
| 6,896,620 B1 | 5/2005 | Luciano et al. |
| 6,902,167 B2 | 6/2005 | Webb |
| 6,923,446 B2 | 8/2005 | Snow |
| 6,938,900 B2 | 9/2005 | Snow |
| 7,011,309 B2 | 3/2006 | Soltys et al. |
| 7,017,805 B2 | 3/2006 | Meehan |
| 7,018,291 B1 | 3/2006 | Lemke et al. |
| 7,022,017 B1 | 4/2006 | Halbritter et al. |
| 7,114,718 B2 | 10/2006 | Grauzer et al. |
| 7,137,630 B2 | 11/2006 | Yurkins |
| 7,186,181 B2 | 3/2007 | Rowe |
| 7,338,372 B2 | 3/2008 | Morrow et al. |
| 7,794,324 B2 | 9/2010 | White et al. |
| 2001/0000933 A1 | 5/2001 | Koelling |
| 2001/0035610 A1 | 11/2001 | Webb |
| 2001/0054794 A1 | 12/2001 | Cole et al. |
| 2001/0054796 A1 | 12/2001 | Lo |
| 2002/0013173 A1 | 1/2002 | Walker et al. |
| 2002/0028710 A1 | 3/2002 | Ishihara et al. |
| 2002/0034974 A1 | 3/2002 | Wood et al. |
| 2002/0042296 A1 | 4/2002 | Walker et al. |
| 2002/0042298 A1 | 4/2002 | Soltys et al. |
| 2002/0042299 A1 | 4/2002 | Soltys et al. |
| 2002/0045472 A1 | 4/2002 | Adams |
| 2002/0068625 A1 | 6/2002 | Soltys et al. |
| 2002/0072405 A1 | 6/2002 | Soltys et al. |
| 2002/0072407 A1 | 6/2002 | Soltys et al. |
| 2002/0094855 A1 | 7/2002 | Berman |
| 2002/0128057 A1* | 9/2002 | Walker .................... A63F 13/12 463/20 |
| 2002/0142825 A1 | 10/2002 | Lark et al. |
| 2002/0151366 A1* | 10/2002 | Walker .................. G07F 17/323 463/42 |
| 2002/0177480 A1 | 11/2002 | Rowe |
| 2002/0187834 A1 | 12/2002 | Rowe et al. |
| 2002/0198036 A1 | 12/2002 | Baerlocher et al. |
| 2003/0003988 A1* | 1/2003 | Walker ................... G06Q 30/02 463/21 |
| 2003/0003997 A1 | 1/2003 | Vuong et al. |
| 2003/0013512 A1 | 1/2003 | Rowe |
| 2003/0045360 A1 | 3/2003 | Hora |
| 2003/0054881 A1 | 3/2003 | Hedrick et al. |
| 2003/0057648 A1 | 3/2003 | Webb |
| 2003/0060276 A1* | 3/2003 | Walker ................. G07F 17/3244 463/25 |
| 2003/0064771 A1 | 4/2003 | Morrow et al. |
| 2003/0064772 A1 | 4/2003 | Tempest et al. |
| 2003/0064785 A1 | 4/2003 | Stone et al. |
| 2003/0069064 A1 | 4/2003 | Ainsworth |
| 2003/0069071 A1 | 4/2003 | Britt et al. |
| 2003/0071418 A1 | 4/2003 | Saucier |
| 2003/0073494 A1 | 4/2003 | Kalpakian et al. |
| 2003/0073496 A1 | 4/2003 | D'Amico et al. |
| 2003/0087696 A1 | 5/2003 | Soltys et al. |
| 2003/0148807 A1* | 8/2003 | Acres ...................... G07F 17/32 463/26 |
| 2003/0151194 A1 | 8/2003 | Hessing et al. |
| 2003/0171142 A1 | 9/2003 | Kaji et al. |
| 2003/0181231 A1 | 9/2003 | Vancura et al. |
| 2003/0190960 A1 | 10/2003 | Jokipii et al. |
| 2003/0207709 A1 | 11/2003 | Paotrakul |
| 2003/0207710 A1 | 11/2003 | Rodgers et al. |
| 2003/0207711 A1 | 11/2003 | Rowe |
| 2003/0211884 A1 | 11/2003 | Gauselmann |
| 2003/0211889 A1* | 11/2003 | Walker .................... A63F 3/081 463/42 |
| 2003/0216169 A1* | 11/2003 | Walker .................. G06Q 30/02 463/25 |
| 2003/0236116 A1 | 12/2003 | Marks et al. |
| 2004/0029631 A1 | 2/2004 | Duhamel |
| 2004/0053673 A1 | 3/2004 | Mishra |
| 2004/0053683 A1 | 3/2004 | Harti et al. |
| 2004/0056418 A1 | 3/2004 | Wirth |
| 2004/0056419 A1 | 3/2004 | Wirth |
| 2004/0061288 A1 | 4/2004 | Snow |
| 2004/0070146 A1 | 4/2004 | Snow |
| 2004/0072619 A1 | 4/2004 | Brosnan et al. |
| 2004/0092306 A1 | 5/2004 | George et al. |
| 2004/0127284 A1 | 7/2004 | Walker et al. |
| 2004/0142742 A1* | 7/2004 | Schneider ........... G07F 17/3225 463/25 |
| 2004/0152509 A1 | 8/2004 | Hornik et al. |
| 2004/0164491 A1 | 8/2004 | Webb |
| 2004/0183256 A1 | 9/2004 | Ko |
| 2004/0195770 A1 | 10/2004 | Ornstein |
| 2004/0224777 A1 | 11/2004 | Smith et al. |
| 2004/0251630 A1 | 12/2004 | Sines et al. |
| 2004/0254010 A1* | 12/2004 | Fine ........................ G07F 17/32 463/25 |
| 2005/0012273 A1 | 1/2005 | Bruno et al. |
| 2005/0026263 A1 | 2/2005 | Gururajan |
| 2005/0026683 A1 | 2/2005 | Fujimoto |
| 2005/0029743 A1 | 2/2005 | Daines |
| 2005/0032563 A1 | 2/2005 | Sines |
| 2005/0032564 A1 | 2/2005 | Sines |
| 2005/0037837 A1 | 2/2005 | Rowe |
| 2005/0051963 A1 | 3/2005 | Snow |
| 2005/0054408 A1 | 3/2005 | Steil et al. |
| 2005/0059461 A1 | 3/2005 | Ching et al. |
| 2005/0073100 A1 | 4/2005 | Falciglia, Sr. |
| 2005/0073102 A1 | 4/2005 | Yoseloff et al. |
| 2005/0082758 A1 | 4/2005 | Sklansky et al. |
| 2005/0116414 A1 | 6/2005 | Yurkins |
| 2005/0119047 A1 | 6/2005 | Olive |
| 2005/0119048 A1 | 6/2005 | Soltys et al. |
| 2005/0119052 A1 | 6/2005 | Russell et al. |
| 2005/0143168 A1 | 6/2005 | Torango |
| 2005/0161882 A1 | 7/2005 | Miller |
| 2005/0164760 A1 | 7/2005 | Moody |
| 2005/0176488 A1 | 8/2005 | Olive |
| 2005/0209004 A1 | 9/2005 | Torango |
| 2005/0239542 A1 | 10/2005 | Olsen |
| 2005/0269776 A1 | 12/2005 | Miller |
| 2005/0277463 A1 | 12/2005 | Knust et al. |
| 2005/0282622 A1 | 12/2005 | Lindquist |
| 2006/0001211 A1 | 1/2006 | Lewis et al. |
| 2006/0019739 A1 | 1/2006 | Soltys et al. |
| 2006/0027970 A1 | 2/2006 | Kyrychenko |
| 2006/0058082 A1 | 3/2006 | Crawford, III et al. |
| 2006/0058083 A1 | 3/2006 | Crawford, III et al. |
| 2006/0058084 A1 | 3/2006 | Crawford, III et al. |
| 2006/0058085 A1 | 3/2006 | White et al. |
| 2006/0058086 A1 | 3/2006 | White et al. |
| 2006/0058087 A1 | 3/2006 | White et al. |
| 2006/0058088 A1 | 3/2006 | Crawford, III et al. |
| 2006/0058089 A1 | 3/2006 | White et al. |
| 2006/0058090 A1 | 3/2006 | Crawford, III et al. |
| 2006/0058091 A1 | 3/2006 | Crawford, III et al. |
| 2006/0058093 A1 | 3/2006 | White et al. |
| 2006/0066052 A1 | 3/2006 | White et al. |
| 2006/0068864 A1 | 3/2006 | White et al. |
| 2006/0068865 A1 | 3/2006 | White et al. |
| 2006/0068866 A1 | 3/2006 | White et al. |
| 2006/0068867 A1 | 3/2006 | White et al. |
| 2006/0068868 A1 | 3/2006 | Crawford, III et al. |
| 2006/0068869 A1 | 3/2006 | White |
| 2006/0068870 A1 | 3/2006 | Crawford, III et al. |
| 2006/0068871 A1 | 3/2006 | Crawford, TTI et al. |
| 2006/0068879 A1 | 3/2006 | Crawford, III et al. |
| 2006/0068899 A1 | 3/2006 | White et al. |
| 2006/0160600 A1 | 7/2006 | Hill et al. |
| 2006/0160608 A1 | 7/2006 | Hill et al. |
| 2006/0165254 A1 | 7/2006 | Fujimoto et al. |
| 2006/0177109 A1 | 8/2006 | Storch |
| 2006/0202422 A1 | 9/2006 | Bahar |
| 2006/0223638 A1 | 10/2006 | Koyama et al. |
| 2006/0252521 A1 | 11/2006 | Gururajan et al. |
| 2006/0252554 A1 | 11/2006 | Gururajan et al. |
| 2006/0258427 A1 | 11/2006 | Rowe et al. |

(56) References Cited

U.S. PATENT DOCUMENTS

| | | |
|---|---|---|
| 2006/0258442 A1 | 11/2006 | Ryan |
| 2006/0264252 A1 | 11/2006 | White et al. |
| 2006/0264257 A1 | 11/2006 | Jaffe et al. |
| 2006/0287066 A1 | 12/2006 | Crawford, III et al. |
| 2006/0287067 A1 | 12/2006 | White et al. |
| 2006/0287101 A1 | 12/2006 | Crawford, III et al. |
| 2006/0287102 A1 | 12/2006 | White et al. |
| 2006/0287103 A1 | 12/2006 | Crawford, III et al. |
| 2006/0287104 A1 | 12/2006 | White et al. |
| 2006/0293099 A1 | 12/2006 | Cooper |
| 2007/0265064 A1 | 11/2007 | Kessman et al. |
| 2009/0124377 A1 | 5/2009 | Rader et al. |
| 2009/0131174 A1 | 5/2009 | Hutchinson-Kay et al. |

FOREIGN PATENT DOCUMENTS

| | | |
|---|---|---|
| EP | 0 945 837 | 9/1999 |
| EP | 0 984 408 | 3/2000 |
| EP | 0 984 409 | 3/2000 |
| EP | 1 469 432 | 4/2004 |
| EP | 1 532 594 | 11/2006 |
| GB | 2 096 376 | 10/1982 |
| GB | 2 097 160 | 10/1982 |
| GB | 2 100 905 | 1/1983 |
| GB | 2 117 952 | 10/1983 |
| GB | 2 137 392 | 10/1984 |
| GB | 2 142 457 | 1/1985 |
| GB | 2 153 572 | 8/1985 |
| GB | 2 161 008 | 1/1986 |
| GB | 2 161 009 | 1/1986 |
| GB | 2 170 636 | 8/1986 |
| GB | 2 180 682 | 4/1987 |
| GB | 2 181 589 | 4/1987 |
| GB | 2 183 882 | 6/1987 |
| GB | 2 191 030 | 12/1987 |
| GB | 2 222 712 | 3/1990 |
| GB | 2 226 907 | 7/1990 |
| GB | 2 408 951 | 6/2005 |
| WO | WO 98/47115 | 10/1998 |
| WO | WO 98/51384 | 11/1998 |
| WO | WO 00/12186 | 3/2000 |
| WO | WO 03/025828 | 3/2003 |
| WO | WO 2004/021294 | 3/2004 |
| WO | WO 2005/029814 | 3/2005 |

OTHER PUBLICATIONS

ISR dated Mar. 24, 2005, from corresponding PCT Application No. PCT/US04/030198.
International Written Opinion dated Mar. 22, 2005, from corresponding PCT Application No. PCT/US04/030198.
Australian Examination Report dated Aug. 27, 2010, issued in AU2004305823.
Australian Examination Report dated Sep. 1, 2009, issued in AU2004305823.
Chinese Office Action dated Dec. 5, 2008, from Application No. 2004800265558.
Chinese Office Action dated Jul. 17, 2009 from Application No. 2004800265558.
Chinese Decision ofthe Office Rejection dated Nov. 27, 2009 from Application No. CN20048002655.8.
Description of Poker written by Hoyle's Rules of Games published 1946-1983.
Tetris Game Description written by Radica/published in 2000.
Top Dollar Brochure written by TGT/published in 1998.
U.S. Office Action dated Mar. 12, 2010 from U.S. Appl. No. 12/352,984 [KL].
US. Office Action dated Nov. 2, 2009 from U.S. Appl. No. 12/352,984.[KL].
U.S. Office Action dated Jul. 27, 2010 issued in U.S. Appl. No. 12/352,984 [KL].
U.S. Office Action dated Nov. 3, 2010 issued in U.S. Appl. No. 12/352,984 [KL].
U.S. Office Action dated Jul. 6, 2007 from U.S. Appl. No. 10/942,208.
U.S. Final Office Action dated Jan. 7, 2008 from U.S. Appl. No. 10/942,208.
U.S. Advisory Action dated Mar. 28, 2008 from U.S. Appl. No. 10/942,208.
U.S. Office Action datcd Jul. 11, 2008 from U.S. Appl. No. 10/942,208.
U.S. Final Office Action dated Jan. 26, 2009 from U.S. Appl. No. 10/942,208.
U.S. Advisory Action dated May 12, 2009 from U.S. Appl. No. 10/942,208.
U.S. Office Action dated Nov. 20, 2009 from U.S. Appl. No. 10/942,208.
AU Examination Report dated Dec. 10, 2012 issued in Application No. 2004305823.
AU Examination Report dated Jul. 26, 2012 issued in Application No. 2011202868.

* cited by examiner

PLAYER SPECIFIC NETWORK

PRIORITY CLAIM

This application is a continuation of, and claims priority to and the benefit of U.S. patent application Ser. No. 14/551,830, which was filed on Nov. 24, 2014, which is a continuation of, and claims priority to and the benefit of U.S. patent application Ser. No. 12/881,126, which was filed on Sep. 13, 2010, and is abandoned, which is a continuation of, and claims priority to and the benefit of, U.S. patent application Ser. No. 10/942,208, which was filed on Sep. 15, 2004, and is abandoned, which claims priority to and the benefit of U.S. Provisional Patent Application No. 60/503,516, which was filed on Sep. 15, 2003, and is expired, the entire contents of each of which are incorporated herein by reference.

TECHNICAL FIELD

This disclosure is related to gaming networks and, more particularly, to gaming networks that can be tailored based on an identity and/or a history of the player.

BACKGROUND OF THE INVENTION

Because there are many choices of casinos from which a patron can choose, casinos are constantly searching for ways to differentiate themselves. One such method is by developing new games and gaming environments that encourage players to return. Loyalty programs are well known; where players earn an award for playing gaming devices with the amount of the award determined by the amount of coins deposited into the game, game outcome, certain bonuses or extra awards won, or other various factors. Typically, the awards accumulate in an account, similar to frequent flyer miles, until used by the patron. By returning to the same casino, or same group of casinos, the award account can accumulate to a valuable amount.

Although loyalty programs are successful in encouraging patrons to return, patrons are always seeking new, unique, and interesting ways to be entertained and to get a maximum benefit from their entertainment dollar.

Embodiments of the invention address this need.

DETAILED DESCRIPTION OF THE PREFERRED EMBODIMENTS

Embodiments of the invention are directed to an electronic gaming device machine platform that is operative over a gaming network. A player tracking system can be integrated with the machine via the PSGS Architecture. Embodiments of the invention allow an ability to track individual game activity and adjust game characteristics to meet a player's tastes, play habits, and gaming budget, an ability to provide loyalty inducing awards that directly impact game play, and ability to allow a casino to more directly communicate loyalty building promotional information to a customer, and an ability for the casino to rapidly change loyalty promotions, for instance.

In this disclosure, is assumed that traditional gaming machine functionality exists in the game platform as is known in the art, such as reels, video displays, spin buttons, bet buttons, player tracking systems, etc.

Figure 1:
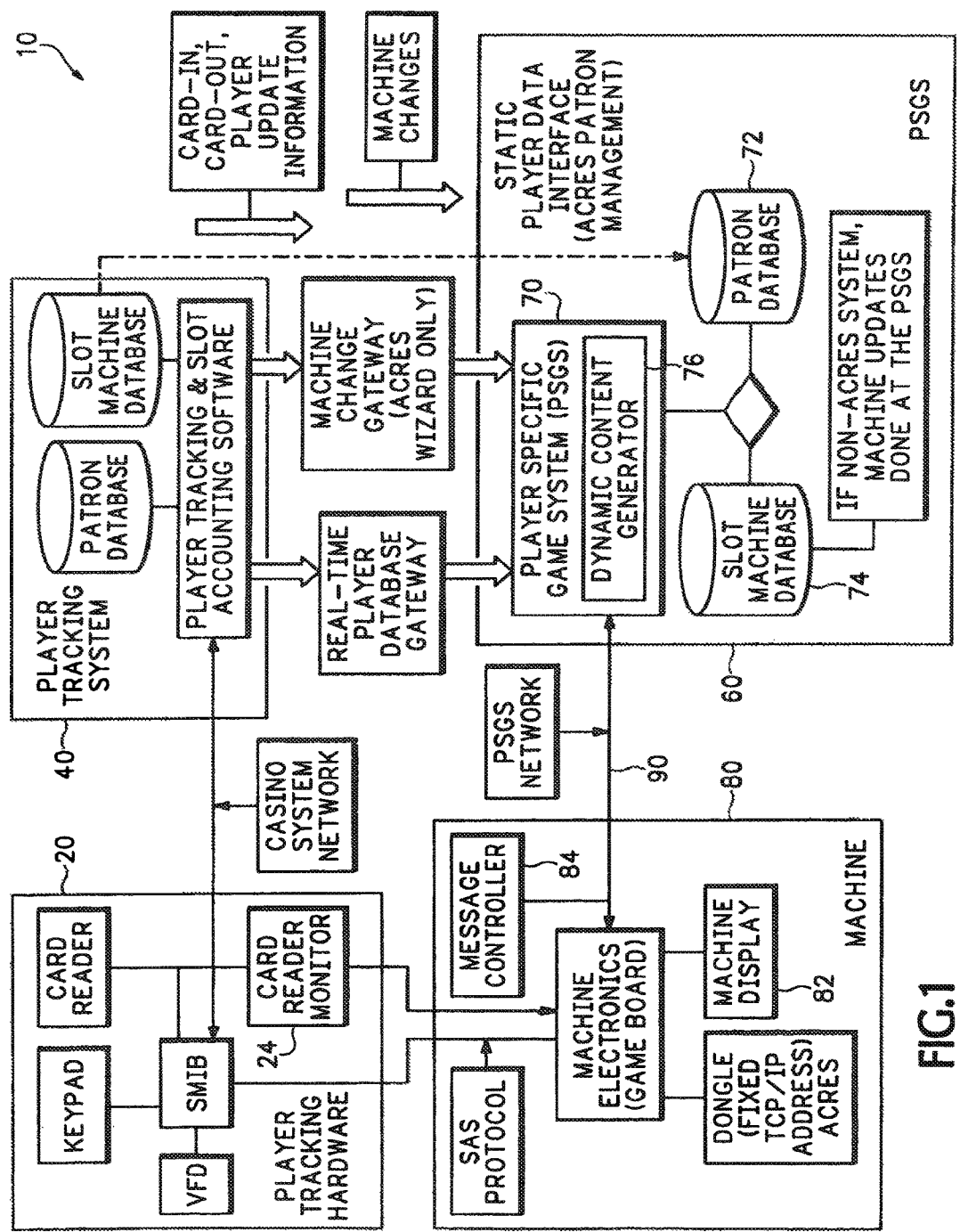
FIG. 1 is a functional block diagram of components in an example gaming network according to embodiments of the invention.

An architecture system 10 is illustrated in FIG. 1. Generally, the architecture system 10 includes player tracking hardware 20, a player tracking system 40, a data interface 60, and a gaming machine 80. Although only one gaming machine 80 is illustrated, multiple gaming machines 80 would typically be connected in the architecture system 10.

The machine 80 will integrate with the player tracking system 60 via a Player Specific Gaming System (PSGS) 70 described below. The PSGS system 70 can be a collection of one or more computer servers operating in conjunction to host programs and data to create a user-specific gaming system. The PSGS 70 includes of a patron database 72 that stores player related information from play session to play session. It also contains a slot machine database 74. The patron database 72 is linked to each gaming device 80 by a dedicated high-speed communication network. This network is independent from any existing slot accounting/player-tracking network. The PSGS 70 is designed to work in parallel with existing slot accounting/player-tracking systems.

Figure 2:
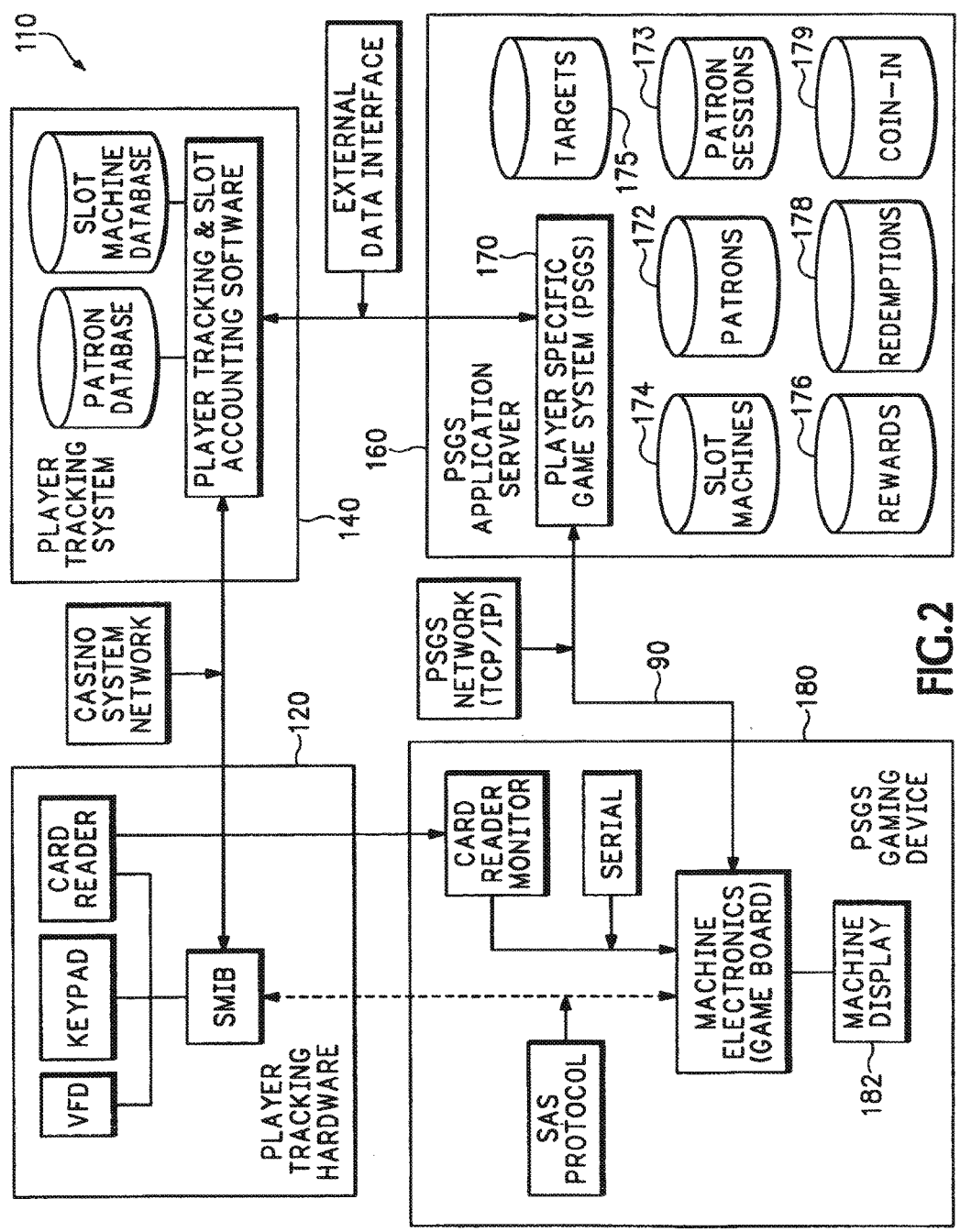
FIG. 2 is a functional block diagram of components in an example gaming network according to other embodiments of the invention.

FIG. 2 illustrates an architecture system 110 similar to the architecture 10 of FIG. 1. Additional specific databases 172-179 are illustrated in FIG. 2, but the same data could be stored in other portions of the architecture 10. Although reference is made in this disclosure to the architecture 10 of FIG. 1, embodiments are equally operable on like or similar components of other architectures, such as the architecture 110 of FIG. 2. Discussion of the additional architectures is omitted for brevity.

Reward Mechanisms

Several unique reward mechanisms can be operated on the architecture system 10. The game theme will define the basic rules of play for that game. Different game themes and art treatments can be applied to each reward mechanism. The reward mechanisms may have two events, a minor reward, which does not award cash or monetary value, and major reward that awards cash or a monetary equivalent. A game theme may have the ability to operate more than one reward feature.

An underlying game theme on the gaming machine 80 is a 5 or 9-line, 5 reel video slot machine. It is assumed that the game machine 80 includes a second screen reward feature that could be won by carded and non-carded players alike. The second reward screen feature may be funded by the overall payback percentage of the machine, however most player specific reward features would typically be funded by a reward pool mechanism, as described below. The reward pool mechanism may be funded similar to a progressive.

An example reward pool mechanism defines a minimum and maximum value, and an associated increment rate. The increment rate may be a percent of coin-in. The gaming machine 80 chooses a value between the minimum and maximum value. Each value between the minimum and maximum are likely to be chosen. This value is given and stored in the PSGS 70. As activity on the gaming machine 80 occurs, the machine 80 increments the player's actual value towards the target value. The actual value is managed by the machine 80 and stored in the PSGS 70. Upon reaching the target value, the machine 80 activates a minor or major reward, as described below.

The target value and actual value are given to PSGS 70 based upon four card-in, minor reward, and major reward events, for example. The target value and actual value are given to the machine 80 upon player identification card insertion.

The minimum, maximum, and increment rates are configured at the PSGS 70. The random number generator used to choose the value between the minimum and maximum may be located on the machine 80.

Both minor and major rewards can be triggered based upon the reward pool mechanism. The minor reward may always be triggered and the reward pool mechanism does not always trigger the major reward. The machine 80 is responsible for triggering minors and majors, utilizing information stored and downloaded from the PSGS 70 or through events that occur in normal game play, example a scatter pay reward game initiator, as is known in the art.

The player will win a minor reward when the pool mechanism is triggered. The minor reward will be awarded via reward game screens in similar manner to traditional game reward. The minor reward awards the player the opportunity to win cash prizes at a future date, based upon a future outcome. The minor reward does not have an actual money value associated with the reward until the major reward is triggered at a future date or outcome.

The major reward can occur in three ways; first, a reward pool mechanism is triggered, second, the player reaches an overall goal, or third, based on a machine outcome. The major reward is awarded via reward screens in a similar manner to game within a game bonus in the marketplace today. The major reward is when the minor rewards earned during prior games or sessions are given a cash value.

While a player is participating in a reward, the pay table remains constant. Upon conclusion of the reward session, a new pay table will be associated with the reward.

Reward Features

Four reward features are described in this section. They are Collection, Return rewards, Cash Drawing Rewards, and Draw Card. Each reward feature is broken into Minor Reward and Major Reward summarizes.

A collection reward feature awards unique and non-unique items that are to be collected as the Minor Reward and awards cash for the number of unique items as the Major Reward.

The Minor Reward is based upon the Reward Pool Mechanism detailed above. The game sets the coin-in trigger that causes the machine to grant the collection of an item. The player obtains their grant by choosing from a selection of objects presented to the player on a gamescreen. The collection of the item can be a unique item or a non-unique item. In the event the item is unique, it is stored in the PSGS 70. The player can look at the inventory of items and their worth at any point to in the game. In the event that the item has already been earned, the machine tells the player that the item was a duplicate. The non-unique items earned are stored in PSGS 70, but may be held unavailable for the customer to review. The value of the items collected is displayed in the Reward Feature Message area, which is described below.

The Major Reward is based upon the player earning the predetermined number of collection opportunities. Upon reset or inserting the card for the first time, the machine 80 decides how many opportunities the player will have to earn unique items. This number is stored in the PSGS 70. The machine will examine how many opportunities a player has had, upon meeting the criteria the machine will trigger the Major Reward. The PSGS 70 stores how many times the player has had an opportunity, as well as the number of opportunities the player will have to earn unique items. Based upon the number of items, the machine 80 will award a cash prize to the customer through a series of screens, similar to a game Reward round. Upon completing the award, the customer starts over collecting items, and all Reward Pool Mechanisms and predetermined opportunities are reset to corresponding values.

The Return Reward Feature awards promotional credits that can be redeemed at a later date. The qualification for Return Rewards is the Minor Reward, and the winning and redemption of the promotional or extra credits occurs at a future date via the Major Reward.

The Minor Reward is based upon the Reward Feature Pool Mechanism detailed above. The game 80 sets the coin-in trigger that causes the machine to grant the Return Rewards feature. Upon the trigger occurring, the player will be notified of their qualification and when they will be able to redeem the reward. The PSGS 70 stores the fact that the player has qualified for the Reward.

The Major Reward is based upon a player returning to the casino after a specified period of time and placing their player tracking card in an appropriately configured game 80. Upon inserting the card, the machine 80 presents a selection mechanism, for example a video wheel that has multiple values. The values on the wheel are provided by the PSGS 70. Upon spinning the wheel, the customer will be informed that they have won a number of promotional credits redeemable at that time. In some embodiments the player must redeem the prize at that moment. The machine 80 will update the PSGS 70 on the status of the player's redemption. The player will then have the ability to play their promotional credits. The player receives the credits through a series of screens reinforcing why they received the credits.

The Cash Draw Rewards feature awards Cash Drawing Tickets, which can, be redeemed at future date for cash prizes during the Cash Drawing. The awarding of Cash Drawing Tickets is the Minor Reward, and the Cash Drawing Rewards where the tickets are awarded a value is the Major Reward. For example, upon inserting a player tracking card, the game changes one or more squares located on a game board from "Casino Night" to "Cash Drawing". These squares are hit when a player hits a scatter pay triggering the game Reward, and then lands on a Cash Drawing square located on the game board. Of course, the drawing tickets can be provided to the player in other ways, but typically would include a chance mechanism.

The Minor Reward is based upon the Reward Pool Mechanism detailed above. The game 80 sets the coin-in trigger that causes the machine to grant the player an opportunity to win a number of Cash Drawing Tickets. Upon the trigger occurring, the player will proceed to have an opportunity to earn a random number of tickets. The number of ticket earned is stored on the PSGS 70. The player has the ability to examine their inventory of tickets. Each ticket may be assigned a series of numbers that are represented on the ticket. In addition to the series of number representing the unique value of the ticket, the ticket also may have an individual color assigned to the ticket by the player during the Reward Feature. The player can choose one of, for example, four available colors. There typically is a maximum number of Cash Drawing Tickets that can be earned before triggering the Cash Drawing Major Reward. If the maximum number is reached, the system 10 may limit the number of any future tickets issued to the player until after the already issued tickets have been redeemed.

The Major Reward is based upon the player landing on a specific spot on game board during a machine Reward round. A scatter pay triggers the machine Reward round. Upon landing on the spot, the player gets to participate in a Cash Drawing Rewards. There can be, for example, five levels of prizes that can be won.

Beginning with the lowest prize, the machine 80 simulates a Cash Drawing. If the machine 80 chooses a player's winning ticket, the value is awarded to the player, using any conventional manner, and the player advances to the next level of prize. The winning ticket is eliminated from future Cash Drawing Rewards. If the player does not have a winning ticket, the player advances to the next level. Each level is repeated, upon completing all levels remaining tickets are declared non-winning, and the player collects the winnings and begins earning Cash Drawing Rewards tickets all over again. All non-winning tickets are forfeited at the conclusion of the drawing.

The Draw Card Reward is based upon the Reward Pool Mechanism detailed above. The awarding of Draw Cards is the Minor Reward, and the redemption of Draw Cards for value occurs in the Major Reward.

The Minor Reward for the Draw Card is based upon the Reward Pool Mechanism. The game sets the coin-in trigger that causes the machine to grant the Draw Card Tickets. Upon the trigger occurring, the machine 80 will proceed to show a ticket drawn and placed on the game board. The location and value of the Draw Cards are stored in the PSGS 70. The player has the ability to view their game screen. In some embodiments, Draw Cards cannot be placed on the Cash Drawing square located on the game board.

The Major Reward for the Draw Card is based upon the player landing on a specific spot on game board during a machine Reward round. The machine Reward round occurs on a scatter pay. Upon landing on the spot, the player wins an amount based upon the base game Reward. In addition to the base game pay, the player gets to collect additional cash prizes for having a Draw Card-in that location. As a player moves past locations with Draw Cards, the Draw Cards are removed from the game board.

Example Game Screen

FIG. 2 illustrates an example configuration 200 of a game screen that can be displayed on a machine 82 of the gaming machine 80 (FIG. 1). A Reward Feature Messaging Area 210 is essentially a banner with messaging graphics that change merchandising the Reward Features, Status in the Reward Feature, Help Screens, Pay Table Screens, and other miscellaneous details described herein. The graphical messaging may be stored on the machine 80, and the PSGS 70 will signal the machine 80 when to display those graphics. The PSGS 70 can use any appropriate message or signaling protocol between itself and the machine 80, such as the one described below. Other areas of the game screen 200 include game reels 220, which may include 5 reels, 9 reels, or any other appropriate number, as well as a messaging area 230 that presents data related to buttons and game meters. The information driving the messaging area 230 can come from the game 80, the PSGS 70, or elsewhere on the architecture system 10 of FIG. 1.

A Game Start Screen is a screen shown on the machine display 82 at the commencement of a game. In some embodiments, the Game Start Screen merchandises the Reward Feature, emphasizing the use of the player's card. In addition, this screen will allow the non-carded player to view a details screen, described below, as well as the pay table for the Reward Feature. Upon insertion of the player card, the Reward Feature Messaging 210 area will welcome the customer by name, and will begin communicating their status in the Reward Feature. This communication is described in more detail below.

The game played on the machine 80 may continually display information to the player that summarizes their current Reward Feature Status in the Reward Feature Messaging Area 210. The following messaging in Table 1 are examples of what might be displayed:

TABLE 1

| Status | Action | Message |
|---|---|---|
| Idle Game | No Play | Attract message enticing play |
| Game Play | No Card-In | Entice message encouraging carded play |
| Game Play | Eligible Card-In | Messaging alternating between several graphics |
| Current List of Items Prize Potential | | Graphical Representation Items Collected are through the entire Reward round (Collect all 10 items to win $10,000) |

Game status information will be detailed further below.

Figure 3:
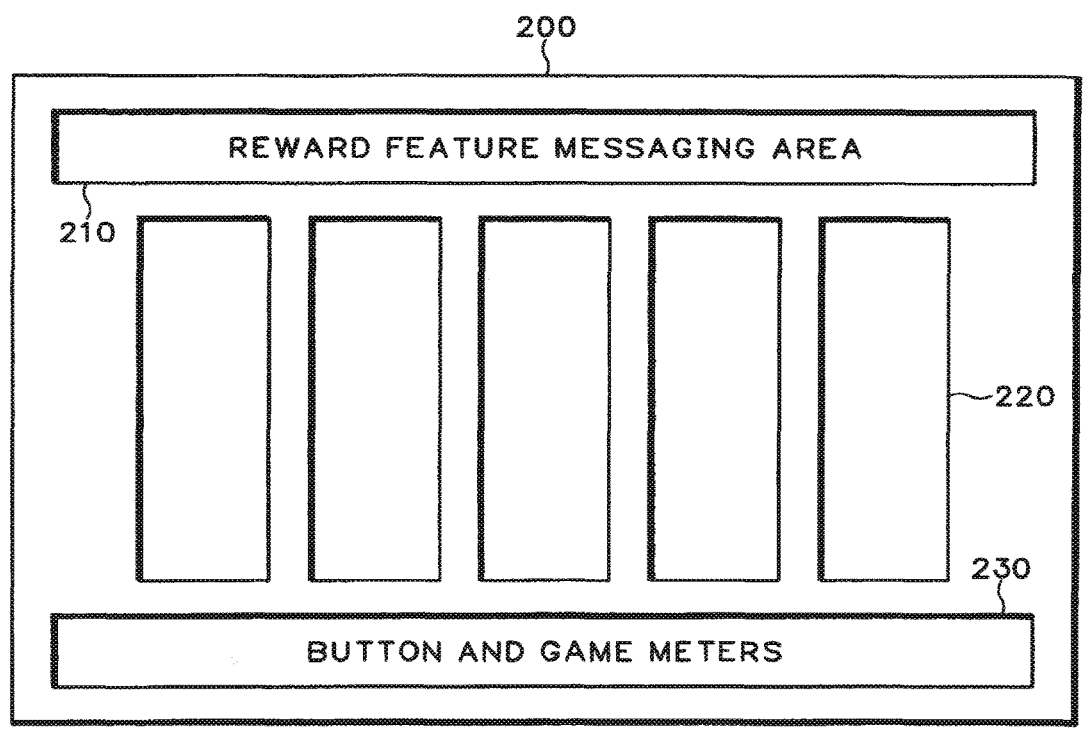
FIG. 3 is a block diagram of a sample game screen according to embodiments of the invention.
Figure 4:
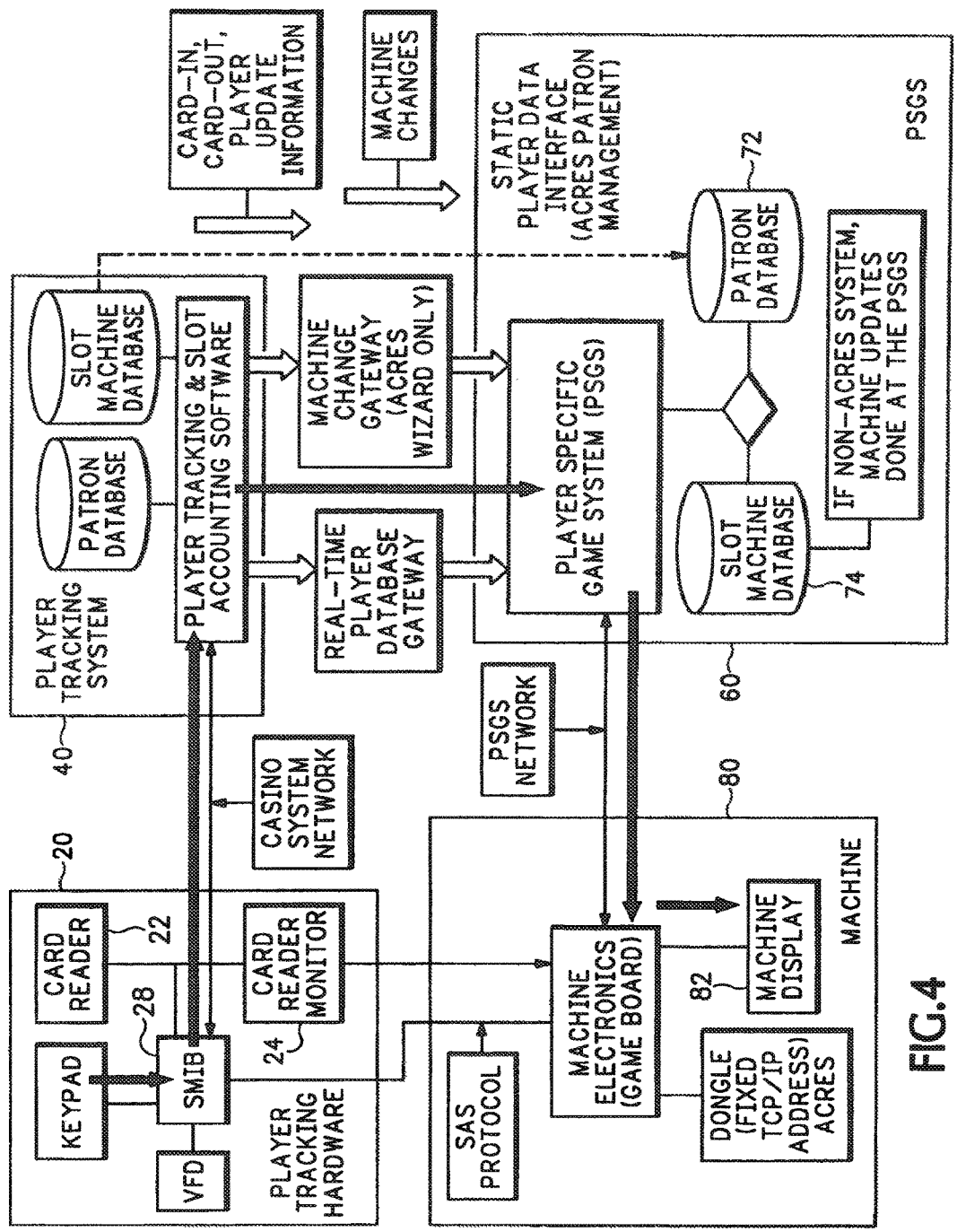
FIG. 4 is a block diagram indicating how information can be flowed across the network of FIG. 1.

Promotional concepts implemented in the PSGS 70 system are based on the presumption that details about the player are known somewhere on the architecture 10. The details may be stored on the machine 80. These details may also be stored in the patron database 72 of the PSGS 70 or elsewhere on the architecture 10. The player will be identified to the machine 80 using the existing player tracking card and slot data collection system. An example data flow through the PSGS is illustrated in FIG. 3. The diagram depicts the flow of messaging through the architecture 10 including the PSGS 70 when a player inserts their card-into a machine. Examples illustrated in FIG. 3 include:

(1) A player inserts a player-tracking card with identifying card number in a card reader 22 of the player tracking hardware 20.

(2) A Serial Machine Interface Board (SMIB) 28, such as that described in U.S. Pat. No. 5,655,961 assigned to the assignee of the present invention and incorporated herein by reference performs low level number checking then forwards the card-in request to player tracking system 20.

(3) The player tracking system 20 confirms an active account status by checking the player tracking card against data stored in the architecture 10, and then forwards an appropriate card-in message to the PSGS 70.

(4) The PSGS 70 looks up rewarding related data for that player and forwards information to the machine 80.

(5) The machine 80 processes reward information, making appropriate adjustments to game behavior.

(6) Promotional information presented to the player on the machine video screen 200 illustrated in FIG. 2, or on another screen shown on the machine display 82.

(7) At the start of a carded play session, a special card-in message is preferably displayed in the Reward message area 210.

Player Identification Protocol

In some embodiments, all messages and transactions between the machine 80 and the PSGS 70 of the architecture 10 of FIG. 1 are tracked by player card id as an identifier. The player-tracking system 20 validates the player card id for the PSGS 70. The PSGS 70 manages and stores the card id for use by the machine and the PSGS. In some embodiments, all message packets include the player id.

A Card Reader Monitor 24 (FIG. 1) is a device or a function operated on a processor that acquires the same identification card strip information and insert status that is seen by the player tracking SMIB 28. This device is used to double-check the player tracking system 20 card in and out operation. If the PSGS 70 sees either a Card Reader Monitor 24 card out or a player-tracking 20 generated card out, the PSGS 70 will end a player's session. The PSGS 70 will not start a player session until it sees a card in from the Card Reader Monitor 24 and the player-tracking card in. Upon receiving the first card in, the PSGS 70 starts a timer. Upon receiving the second card in, the PSGS 70 starts the session. If the PSGS 70 does not receive the card in during the allotted time, the PSGS 70 will not start a session, and will request the customer to re-insert card.

One of the purposes of having the card reader monitor 24 is that it allows signals coming out of the hardware card reader to be read and used by other portions of the PSGS 70. The Card Reader Monitor 24 provides a standard mechanism to detect and derive information from player cards that is separate and distinct from existing player tracking/patron management systems.

In implementation the card reader monitor 24 includes a communication system, such as a cabling system attached between the hardware card reader to convert the output to, for example, a standard RS-232 format. The other end of this cable is then attached to a serial port on the machine 80. The card reader monitor 24 also includes a process, such as a software process that runs on a processor in the player tracking system 20 or on the machine 80, for example. This running process monitors that RS-232 port, detects incoming data, decodes the data, and sends an appropriate message to the message controller interface between the machine 80 and the PSGS 70.

Messages sent by the card reader monitor 24 can include, for example card in (with Card ID) card out (with Card ID), and abandoned card (with Card ID). After a message is created it is sent to the PSGS 70 to update the current status of the inserted player tracking card.

A "heartbeat" (periodic messages to ensure another component is still "alive") is initiated by the game 80 or the PSGS 70 to ensure the Card reader monitor 24 is still active. If, for any reason, that heartbeat is lost, the Game 80 is signaled to disable PSGS 70 functionality. A detailed description of a heartbeat implementation is described below.

The card reader monitor 24 may use power from the SMIB 28 for its uP, and power from the machine 80 serial port for optoisolation. In some particular embodiments, if the player tracking card is successfully inserted, the machine 80 will receive a packet from the card reader monitor 24 with the following format: "ISnnnnnnnnn.hh", where Ascii 'I' denotes card insertion detected by the reader switch or optoisolator, Ascii 'S' denotes detection of the card stripe "sync" character, 'n . . . n' are the numeric Ascii representation of characters '0' through '9' encoded on the card. Up to 15 may be included, '.' is the Ascii delimiter between the end of the card numeric data and the beginning of the check field, and 'hh' is the two-digit Ascii-Hex check field that represents the exclusive-oring of the Ascii characters from the 'S' to the '.' inclusive. This will be used by the machine to verify the reception of a valid packet. On a failed insertion, the machine 80 will see: "Ifx", where 'I' denotes an insertion, T denotes a failure, and 'x' is a placeholder for an Ascii lower-case failure code letter: 'c' denotes a failure of expected clock detection, 's' denotes a failure of expected sync character detection, and '1' denotes a failure of expected longitudinal redundancy check. When the card is removed from the reader under any circumstances, the machine 80 will receive a signal including "R<cr>", where Ascii 'R' denotes card removal detected by the reader switch or optoisolator.

Sessions

A session begins as the PSGS 70 recognizing a player's card in the PSGS 70 database 72, 74, or from the patron database of the player tracking system 40. The PSGS 70 recalls the player status in the reward feature. The player status is forwarded to the machine 80. The machine 80 begins managing the player's progress.

A session ends upon the PSGS 70 receiving a card out signal from either the player-tracking system or the Card Reader Monitor 24. However, if a game fails or the PSGS goes down the player's session will end.

For the best possible database accuracy, the updating of the player database from the Machine will be redundant, based upon, for example, four methods:

(1) Card—Out: This event causes the Machine 80 to update the PSGS 70 on customer status at the end of the customer's session.

(2) Timed: The PSGS 70 will poll the machine 80 on a timed basis. The polling will cause the machine to update the PSGS 70 with the player status if applicable. The PSGS 70 will then update the database to store the current information related to the player's session and progress in the game. The Machine 80 will poll the PSGS 70 on a timed basis to verify that the PSGS 70 is still on-line.

(3) Minor Reward: Upon the Machine 80 triggering a Minor Reward, the Machine will poll the PSGS 70 with the outcome of the event.

(4) Major Reward: Upon the Machine 80 triggering a Major Reward, the Machine will poll the PSGS 70 with the outcome of the event.

In the event that PSGS loses connection with Machine 80, during idle periods or prior to the insertion of a player card, the machine 80 will continue to operate in a mode that does not allow players to qualify for the player-based Rewards. The machine 80 will offer to card players the same features and benefits that are offered to non-carded players.

In embodiments of the invention, the machine 80 records all transactions necessary to update the PSGS 70 on all customers who have a card-in before the link failed. In the event that a player has card-inserted with prior to link failure, the machine will need to keep information specific to that session stored and will need to update the PSGS 70 when it comes back on-line. The machine 80 preferably has a capacity to store 200 or more events related to player status in the Reward Feature. Any information required by the PSGS 70 to make the Reward Feature work should be saved in the stored events.

Message Structures

The PSGS 70 and the machine 80 communicate by sending messages between themselves over a "PSGS Network" 90 illustrated in FIG. 1. The structure of the particular messages is implementation specific and may be different from the examples shown herein.

In one example messaging system, the Message Type communicates the origin of the sender. Machine Location and Machine Number represent unique identifiers associate with the Machine 80. Timestamp places a date on each packet. Message Authentication validates the message contents and sender to ensure proper authorization for the information. Detail are illustrated in Table 2.

TABLE 2

| Data | Type | Description | Source |
|---|---|---|---|
| Message Type | Byte | Unique Message Identifier (constant) | Sender |
| Sequence Number | Byte | Unique Message Identifier | Sender |
| Card Id | Char [20] | Unique Player Card Identifier | Sender |
| Player Acct Number | Char [20] | Unique Player Account Identifier | Sender |
| Machine Location | Char [20] | Unique Machine Location Identifier | PSGS |
| Machine Number | Char [20] | Unique Machine Identifier | PSGS |
| Timestamp | Undefined | Troubleshooting and Disputes | PSGS |
| Message Authentic | Ulong | Validates msg contents and sender | Sender |

Acknowledgement messages are replies to the sender, indicating the reception and validation of the transmitted message, such as illustrated in Table 3.

TABLE 3

| Data | Type | Description | Source |
|---|---|---|---|
| Valid Message Type | Byte | Message type that resulted in this Ack | Sender |
| Sequence Number | Byte | Unique Message Identifier | Sender |

Non-acknowledgement (Nak) messages are replies to the sender, indicating the partial reception or invalidation of the transmitted message, as illustrated in Table 4.

TABLE 4

| Data | Type | Description | Source |
|---|---|---|---|
| Invalid Message Type | Byte | Message type that resulted in this Nak | Sender |
| Sequence Number | Byte | Unique Message Identifier | Sender |

Reward enable and disable data structures describes control from PSGS to Machine enabling and disabling Rewarding Features. A communication check message packet is used to verify connectivity between the machine 80 and the PSGS 70.

Configuration Set messaging may include the following fields: Feature Independent Fields, Item Collection Reward Fields and Drawing Reward Fields, These fields detail Reward operation parameters.

Script/Random Mode defines how the machine 80 is to award prize amounts. The scripted mode is a reward sequence where a series of graphical steps results in a predetermined outcome. The random mode is a random number generator (RNG) call performed by the machine to determine the reward outcome. Minimum Reward Position assists the Machine in graphically communicating to the player the start position in the Major Reward. Maximum Reward Position assists the Machine in graphically communicating to the player the ending position in the Major Reward. Collection Pool Minimum is the minimum position for the Reward Pool Mechanism. Collection Pool Maximum is the maximum position for the Reward Pool Mechanism. The Collection Pool Increment Rate is a percent of coin-in used to fund the final prize amount. Examples are illustrated in Table 5.

TABLE 5

| Data | Type | Description | Source |
|---|---|---|---|
| Script/ Random Mode | Byte | Flag Controlling Collection Random or Database | PSGS |
| Minimum Reward Position | Uint | Lowest Absolute Position in Collection Reward | PSGS |
| Maximum Reward Position | Uint | Highest Absolute Position in Collection Reward | PSGS |

Script/Random Mode defines how the Machine 80 is to award prize amounts. The scripted mode is a reward sequence where a series of graphical steps results in a predetermined outcome. The random mode is a random number generator (RNG) call performed by the machine to determine the reward outcome. An example message protocol is illustrated in Table 6.

TABLE 6

| Data | Type | Description | Source |
| --- | --- | --- | --- |
| Script/Random Flag | Byte | Flag Controlling Drawing Random or Database Script Method | PSGS |

Script/Random Mode defines how the Machine 80 is to award prize amounts. The scripted mode is a reward sequence where a series of graphical steps results in a predetermined outcome. The random mode is a random number generator (RNG) call performed by the machine to determine the reward outcome. Minimum Draw Card Rewards Position stores minimum location of the card on the game board. Maximum Draw Card Rewards Position stores maximum location of the card on the game board. An example message protocol is illustrated in Table 7.

TABLE 7

| Data | Type | Description | Source |
| --- | --- | --- | --- |
| Script/Random Mode | Byte | Flag Controlling Draw Card Random or Database Script Method | PSGS |
| Minimum Draw Card Reward Position | Uint | Lowest absolute position in Location Reward | PSGS |
| Maximum Draw Card Reward Position | Uint | Maximum absolute position in Location Reward | PSGS |

Card-in response messaging may include the following fields: Feature Independent Fields, Item Collection Reward Fields, and Drawing Reward Fields. These fields detail Reward status and parameters. Player Nick Name or First Name is used in the Reward Feature Messaging Area to welcome the guest. The Player Last Name is used to continue to create unique identifiers for the PSGS. Player tier is a quality ranking. Currently, this field is not used but may be used in future applications. Player ID is the unique number identifier for the Player Tracking System. Pin is the unique number that the player uses to access their account. Pin Lock Count is used to assist with managing the Machine and the PSGS in the event that PIN entry has failed. An example message protocol is illustrated in Table 8.

TABLE 8

| Data | Type | Description | Source |
| --- | --- | --- | --- |
| Player Nick Name or First Name | Char [15] | Player Preferred Name | Player Tracking System |
| Player Last Name | Char [15] | Player Last Name | Player Tracking System |
| Player Tier | Byte | Player Quality Ranking | PSGS |
| Player ID | Ulong | Unique Database Identifier | PSGS |
| Pin | Char [11] | Player Pin Pad Entry Code | Player Tracking System |
| Pin Lock Count | Byte | Account Tamper Threshold | Player Tracking System |

The Current Position is the player's location in the collection Reward. Total Number of Unique Items is the maximum number of opportunities the player will have to collect unique items. The Final Prize Award Table Index points the machine to the player specific pay table. The pay table is located on the machine. This is the pay table associated with this Reward Feature. Collection Count is the number of unique items in a player's collection. Collection Array is the indexed value of earned items. Collection Pool Current is the current pool amount based upon the player's coin-in and associated incrimination, The Collection Pool Threshold is the target position to trigger the Major Reward. This value is created by the Machine and stored by the PSGS. An example message protocol is illustrated in Table 9.

TABLE 9

| Data | Type | Description | Source |
| --- | --- | --- | --- |
| Current Position | Uint | Current Player Position in Reward | PSGS |
| Total Number of Unique Items (NOU) | Byte | Maximum Number of Opportunities to Earn Unique Items in Collection Reward | PSGS |
| Collection Count | Byte | Number of items in player collection | PSGS |
| Collection Array | Byte [NOU] | Current Items in Collection (items are indexed) | PSGS |
| Collection Pool, Current | Uint | Current Position in Item Collection Pool | PSGS |
| Collection Pool, Threshold | Uint | Target Position in Collection Pool | PSGS |
| Drawing Scripts | | To be Determined | PSGS |
| Collection Pool, Minimum | Uint | Minimum Position in Collection Reward Pool | PSGS |
| Collection Pool, Maximum | Uint | Maximum Position in Collection Reward Pool | PSGS |
| Collection Pool, Increment Rate | Uint | Percent of coin-in allocated to Item Collection Pool (.0001 to .9999) | PSGS |
| Script Index | Byte | Players position in script | PSGS |

The Return Reward Status from the PSGS system 70 to the machine 80 signals the machine 80 to know whether the player has a pending Return Rewards or whether the player has been awarded a value. Return Reward Credit Value is the award given to the player based upon the outcome of the Award Table and associated probabilities. The Return Rewards Award Table is the award and the probability of winning the award in this feature. This table is downloaded and associated with the player each time the redeem the Reward. The Relative Time to Availability is the minimum time required before the player is eligible to redeem their Return Rewards prize.

Random Mode defines how the Machine 80 awards prize amounts. The random mode is a random number generator (RNG) call performed by the machine to determine the reward outcome. The Return Rewards Award Table is the award and the probability of winning the award in this feature. This table is downloaded and associated with the player each time the redeem the Reward. Return Rewards Pool Minimum is minimum pool value set for the Reward Pool Mechanism, and the Return Rewards Pool Maximum is the maximum pool value set for the Reward Pool Mechanism. The Return Rewards Pool Increment Rate is the contribution of coin-in to fund the Reward. An example message protocol is illustrated in Table 10.

TABLE 10

| Data | Type | Description | Source |
| --- | --- | --- | --- |
| Return Reward Status | Byte | 0 = Pending, 1 = | PSGS |
| Return Reward Credit Value | Uint | Award Value Earned | PSGS |
| Return Rewards Award Table | Ulong[ ][ ] | Award and Weight Table | PSGS |

TABLE 10-continued

| Data | Type | Description | Source |
|---|---|---|---|
| Relative Time to Availability | TBD | The Minimum time required before player is eligible for Return Rewards | PSGS |
| Return Rewards, Pool, Minimum | Uint | Minimum Pool Amount in Return Rewards Pool | PSGS |
| Return Rewards, Pool, Maximum | Uint | Maximum Pool Amount in Return Rewards Pool | PSGS |
| Return Rewards, Pool, Increment Rate | Uint | Percent of coin-in to trigger Return Rewards feature (.0001 to .9999) | PSGS |

The Current Chances are the number of chances based upon tickets earned. The Chances per Drawing sets the maximum number of tickets earned, which if achieved would shut down the Minor Reward feature in the Cash Drawing Reward feature. The Drawing Award Table Index is the pay table values used in the redemption of tickets for prizes. This table is located on the machine and is associated with each player. A player must complete the Major Bonus before a new pay table index can be associated with the player. Chances Array is the accumulated chances for drawing, which are identified by eight digit numbers and characterized by player chosen color. Chance Pool Current is the current value in the pool. The Chance Pool Threshold is the target value of the pool, which was set by the Machine and stored by the PSGS. The Cash Drawing Pool Minimum is the minimum position for the Reward Pool Mechanism. The Cash Drawing Pool Maximum is the maximum position for the Reward Pool Mechanism. The Cash Drawing Pool Increment Rate is the percent of coin-in used to fund the award table. An example message protocol is illustrated in Table 11.

TABLE 11

| Data | Type | Description | Source |
|---|---|---|---|
| Current Chances | Byte | Number of Chances in Drawing Reward | PSGS |
| Chances Per Drawings (CPD) | Byte | Maximum number of tickets allowed | PSGS |
| Drawings Award Table Index | Byte | Points to active pay table for this player. The pay table is located on the machine. | PSGS |
| Chances Array | Byte [CPD][ID][C] | Accumulated Chances for drawing (chances are identified by 8 digit number and color) | PSGS |
| Chance Pool, Current | Uint | Current position in Chance Pool | PSGS |
| Chance Pool, Threshold | Uint | Target Position in Chance Pool | PSGS |
| Drawing Scripts | | To be Determined | PSGS |
| Cash Drawing Pool, Minimum | Uint | Minimum Position in Chance Pool | PSGS |
| Cash Drawing Pool, Maximum | Uin | Maximum position in Chance Pool | PSGS |
| Cash Drawing Pool, Increment Rate | Uint | Percent of coin-in allocated to Chance Pool (.0001 to .9999) | PSGS |
| Script Index | Byte | Players position in script | PSGS |

The Current Position is the location of the player on the game board. Location Table is the value and geographical position of the Draw Cards on the game board. Location Pool Current is the current value in the pool. The Location Pool Threshold is the target value of the pool, which was set by the Machine and stored by the PSGS. The Draw Card Pool Minimum is the minimum value used in the Reward Pool Mechanism. The Draw Card Pool Maximum is the maximum value used in the Reward Pool Mechanism. The Draw Card Rewards Pool Increment Rate is the contribution of coin-in to fund the Reward. An example message protocol is illustrated in Table 12.

TABLE 12

| Data | Type | Description | Source |
|---|---|---|---|
| Current Position | Uint | Current Player Position in Location Reward | PSGS |
| Location Table | Byte[ ][ ] | Location value and graphical representation | PSGS |
| Draw Card Award Table Index | Byte | Points to activate pay table for this player. The pay table is located on the machine | PSGS |
| Draw Card Pool, Minimum | Uint | Minimum Position in Draw Card Pool | PSGS |
| Draw Card Pool, Maximum | Uint | Maximum Position in Draw Card Pool | PSGS |
| Draw Card Pool Increment Rate | Uint | Percent of coin-in allocated to Chance Pool (.0001 to .9999) | PSGS |
| Location Pool, Current | Uint | Current Position in Item Collection Pool | PSGS |
| Location Pool, Threshold | Uint | Target Position in Item Collection Pool | PSGS |

Because the Machine 80 has no internal notice that the player has removed his card from the player-tracking panel, the database must request it. This message need not have any particular data fields.

Card-out event messaging may include the following fields: Feature Independent Fields, Item Collection Reward Fields, and Drawing Reward Fields. These fields detail Player-based Reward status and parameters.

The Current Position is the player's location in the collection Reward. Collection Count is the number of unique items in a player's collection. Collection Array is the indexed value of earned items. Collection Pool Current is the current pool amount based upon the player's coin-in and associated incrimination. The Collection Pool Threshold is the target position to trigger the Major Reward. This value is created by the Machine and stored by the PSGS 70. An example message protocol is illustrated in Table 13.

TABLE 13

| Data | Type | Description | Source |
|---|---|---|---|
| Current Position | Uint | Current Player Position in Reward | PSGS |
| Collection Count | Byte | Number of items in player collection | PSGS |
| Collection Array | Byte [NOU] | Current Items in Collection (items are indexed) | PSGS |
| Repeat Items | Uint | Current Session Total Number of Repeat Items | Machine |
| Collection Pool, Current | Uint | Current Position in Item Collection Pool | PSGS |
| Collection Pool, Threshold | Uint | Target Position in Item Collection Pool | PSGS |

The Return Reward Status lets the machine 80 know whether the player has a pending Return Rewards or whether the player has been awarded a value. Return Reward Credit Value is the award given to the player based upon the outcome of the Award Table and associated probabilities. The Absolute Time to Availability is the minimum time required for the player to redeem the prize. An example message protocol is illustrated in Table 14.

TABLE 14

| Data | Type | Description | Source |
| --- | --- | --- | --- |
| Return Play Credit Value | Uint | Value Earned | PSGS |
| Time Available | Byte | First time, which player can redeem Return Rewards | PSGS |
| Player Accept | Byte | Field Indicating Customer Read and Accepted Instructions | PSGS |

The Current Chances are the number of chances based upon tickets earned. Chances Array is the accumulated chances for drawing, which are identified by eight digit numbers, and characterized player chosen color. Chance Pool Current is the current value in the pool. The Chance Pool Threshold is the target value of the pool, which was set by the Machine and stored by the PSGS. An example message protocol is illustrated in Table 15.

TABLE 15

| Data | Type | Description | Source |
| --- | --- | --- | --- |
| Current Chances | Byte | Number of Chances in Drawing Reward | PSGS |
| Chances Array | Byte [CPD][ID][C] | Accumulated Chacnes for drawing (chances are identified by 8 digit number, and color) | PSGS |
| Chance Pool, Current | Uint | Current Position in Chance Pool | PSGS |
| Chance Pool, Threshold | Uint | Target Position in Chance Pool | PSGS |

The Current Position is the location of the player on the game board. Location Table is the value and geographical position of the Draw Cards on the game board. Location Pool Current is the current value in the pool. The Location Pool Threshold is the target value of the pool, which was set by the Machine and stored by the PSGS. An example message protocol is illustrated in Table 16.

TABLE 16

| Data | Type | Description | Source |
| --- | --- | --- | --- |
| Current Position | Uint | Current Player Position in Location Reward | PSGS |
| Location Table | Byte[ ][ ] | Location value and graphical representation | PSGS |
| Location Pool, Current | Uint | Current Position in Item Location Pool | PSGS |
| Location Pool, Threshold | Uint | Target Position in Item Location Pool | PSGS |

Reward event messaging may include the following message fields: Feature Independent Fields, Item Collection Reward Fields, and Drawing Reward Fields. These fields detail Player-based Reward status and parameters.

The Current Position is the player's location in the collection Reward, Collection Count is the number of unique items in a player's collection. Collection Array is the indexed value of earned items. Collection Pool Current is the current pool amount based upon the player's coin-in and associated incrimination. The Collection Pool Threshold is the target position to trigger the Major Reward. This value is created by the Machine and stored by the PSGS. An example message protocol is illustrated in Table 17.

TABLE 17

| Data | Type | Description | Source |
| --- | --- | --- | --- |
| Current Position | Uint | Current Player Position in Reward | PSGS |
| Collection Count | Byte | Number of items in player collection | PSGS |
| Collection Array | Byte [NOU] | Current Items in Collection (items are indexed) | PSGS |
| Repeat Items | Uint | Current Session Total Number of Repeat Items | Machine |
| Collection Pool, Current | Uint | Current Position in Item Collection Pool | PSGS |
| Collection Pool, Threshold | Uint | Target Position in Item Collection Pool | PSGS |

The Return Reward Status lets the machine 80 know whether the player has a pending Return Rewards or whether the player has been awarded a value. Return Reward Credit Value is the award given to the player based upon the outcome of the Award Table and associated probabilities. The Absolute Time to Availability is the minimum time required for the player to redeem the prize. An example message protocol is illustrated in Table 18.

TABLE 18

| Data | Type | Description | Source |
| --- | --- | --- | --- |
| Return Play Credit Value | Uint | Value Earned | PSGS |
| Time Available | Byte | First time, which player can redeem Return Rewards | PSGS |
| Player Accept | Byte | Field Indicating Customer Read and Accepted Instructions | PSGS |

The Current Chances are the number of chances based upon tickets earned. A Chances Array is the accumulated chances for drawing, which are identified by, for example, eight digit numbers, and characterized by a player chosen color. Chance Pool Current is the current value in the pool. The Chance Pool Threshold is the target value of the pool, which was set by the Machine and stored by the PSGS. An example message protocol is illustrated in Table 19.

TABLE 19

| Data | Type | Description | Source |
| --- | --- | --- | --- |
| Current Chances | Byte | Number of Chances in Drawing Reward | PSGS |
| Chances Array | Byte [CPD][ID][C] | Accumulated Chances for drawing (chances are identified by 8 digit number, and color) | PSGS |
| Chance Pool, Current | Uint | Current Position in Chance Pool | PSGS |
| Chance Pool, Threshold | Uint | Target Position in Chance Pool | PSGS |

The Current Position is the location of the player on the game board. Location Table is the value and geographical position of the Draw Cards on the game board. Location Pool Current is the current value in the pool. The Location Pool Threshold is the target value of the pool, which was set by the Machine and stored by the PSGS 70. An example message protocol is illustrated in Table 20.

TABLE 20

| Data | Type | Description | Source |
| --- | --- | --- | --- |
| Current Position | Uint | Current Player Position in Location Reward | PSGS |
| Location Table | Byte[ ][ ] | Location value and graphical representation | PSGS |
| Location Pool, Current | Uint | Current Position in Item Location Pool | PSGS |
| Location Pool, Threshold | Uint | Target Position in Item Location Pool | PSGS |

The Machine 80 manages all graphical messages and the triggers to cause those messages will typically be managed by the PSGS 70. In the event communication between the PSGS 70 and the Machine 80 is lost, the loss of communication should cause a message error to display a message that the Player Based Reward offering is unavailable. Message errors and communication can take any appropriate form. In addition, some game designs could require that the Reward Message Area be capable of moving around on the screen.

Unique Machine identification

As mentioned above, the architecture 10 can include (and typically will include) several machines 80 coupled to the PSGS 70 and the data interface 60. One way to uniquely identify the machines 80 is to include a non-volatile memory, for example an EEPROM that can be coded with a unique serial number. In some embodiments, the EEPROM may store an Internet Protocol address. The non-volatile memory may be changed or updated as the machine numbers 80 change.

In other embodiments, the Machine 80 may include a "dongle" or other data port connection that includes codes to make the machine 80 uniquely identified. Initialization of machines 80 according to these embodiments may be conducted by configuring the address of the slot machine by installing a UID (Universal ID) Dongle on a parallel port of the machine 80. The Dongle will fix the TCP/IP address to prevent loss of addressing while, for example, replacing the machine electronics. The machine will read the Dongle on reset. The PSGS 70 may be provided the TCP/IP address through a manual entry process.

Advantages of the Dongle method for maintaining TCP/IP addressing at the slot machine are that it assures the system of having a unique id for the slot machine 80. It also allows the architecture 10 to embed a communication encryption key on to the Dongle. Such a structure is simple to setup in the field.

To prevent duplicate TCP/IP addresses, due to the casino network configuration, the architecture 10 may require additional network and software components to be added to the casino's network level.

Figure 5:
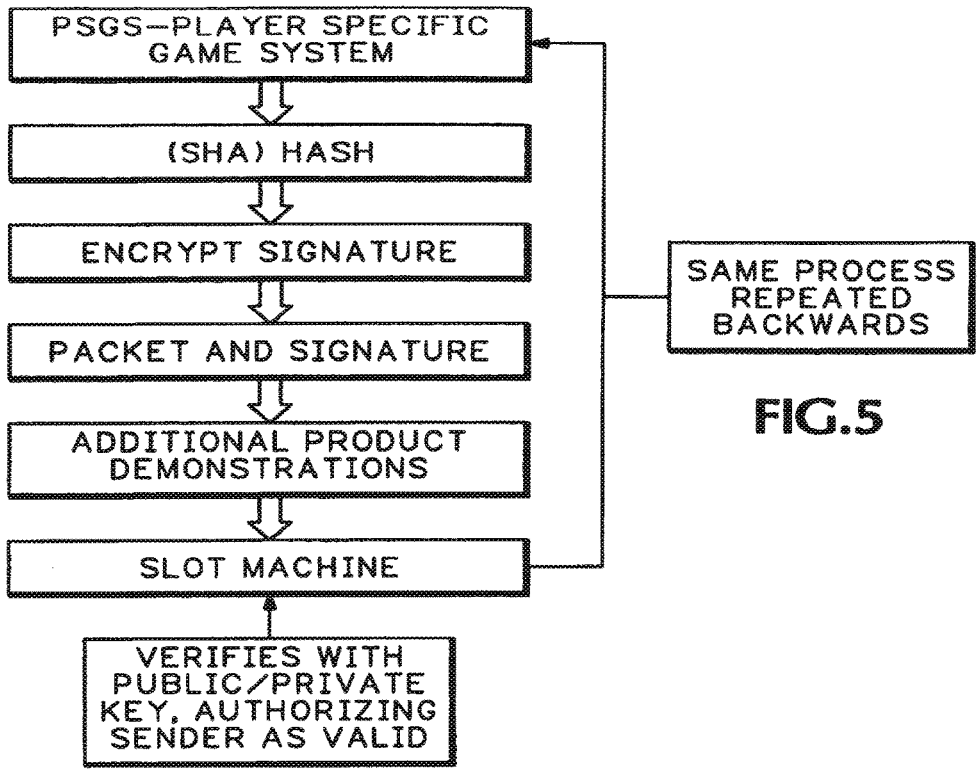
FIG. 5 is an example flow diagram of a verification procedure.

In addition to standard TCP/IP security, the dongle can include a Public/Private Key Encryption (PKE) that can be accessed by the machine 80. Authenticating messages are sent between the machine 80 and the PSGS 70. PKE may be a number of 128-byte encryption or better. A Secure Hashing Algorithm or another acceptable algorithm can be used for hashing. The machine 80, via the dongle and the PSGS 70 can verify packets with each others' public and private keys. Of course, other security methods can be implemented provided they accomplish the requisite level of security needed. An example of a security flow between the PSGS 70 and the machine 80 is illustrated in FIG. 5.

Downloading Machine Pay Tables

Using the architecture 10 system described above, it is possible to add an additional element to the PSGS 70. Specifically, machine pay tables themselves can be downloaded from a central location and into the gaming device 80. Pay tables relate the outcome of a game played and the benefit received by the player for the particular game outcome.

Gaming devices 80 can include a standard pay table for a game, i.e., the pay table that is the standard pay table offerings for that game. In addition, one or more (or all) of the elements within the pay table can be changed. Once changed, they can be downloaded into a gaming device 80 to become the new game table for a particular game.

Game tables can be changed for a number of reasons. For instance they can be changed for different times of the day. Also, they can be changed for specific promotions. The machine pay tables can also be changed for individual players. For instance, a first set of game pay tables can be created for a player with no detail history. Then, as more is learned about the player's style, habits, preferences, skill level, etc., for example the data stored by fields in the patron database or the player tracking database or other database, then the game tables can be modified. Once modified, the PSGS 70 can ensure that the modified pay table is downloaded to the game for the player. In one embodiment, when a player identifies himself or herself by inserting a player tracking card, the PSGS 70 retrieves the personalized machine pay table and downloads it to the machine at which the player is playing. Then, the gaming device changes its current pay table to the one just loaded by the PSGS 70, such that the gaming table is personalized for that player.

As one can imagine, countless variations in modifying machine tables are possible. The PSGS 70 may modify machine paytables at games to which it is connected every hour. Therefore, a particular machine outcome at 5:00 am may be different from one at 11:00 pm. Additionally, if a player known to the PSGS is playing a machine at 5:00 am, the PSGS 70 can be programmed to either override the standard "modified" pay table, or to load the pay table that has been "created" for that particular player. It is also possible to change the paytable to the player specific pay table at some times and not at others. For instance, it is possible to give a player the highest (or lowest) possible payback between either the standard machine paytable or the personalized pay table.

Even further, it is possible to have modified pay tables for each individual game on a machine 80. For instance, pay tables can be modified for games at a first casino, but not at a second casino. Or, pay tables can be modified for a particular game at a casino based on the game's physical location. In short, the PSGS 70 control of modified game tables can extend down to the level of a different pay table for a player for each and every single game to which the PSGS 70 is connected. However, there may be too much overhead in keeping so many modified pay tables for each of the players, and keeping modified pay tables per game type for particular players may be an acceptable level of control/service for the overhead involved.

Authenticating a Game to the PSGS System

Another part of initializing the gaming machines concerns authorization—i.e., is the machine 80 allowed to communicate to the databases connected to the PSGS 70, and is the game player recognized by the PSGS system.

Each machine 80 authenticates with a PSGS 70 database when it powers up. In one embodiment, a message controller sends an XML machine authentication message from the gaming machine to the PSGS server 70. Next, the PSGS 70 performs lookups, and cross-references a machine identification, casino identification, game identification, etc. with the PSGS database illustrated in FIG. 1 or 2.

More than one method is possible. In one embodiment, the PSGS 70 replies that the gaming device 80 cannot be identified, and then the machine cannot enable PSGS 70 functionality. The game 80 may continue to function normally as a normal slot machine, but will not have PSGS 70 specific features. In another method, the PSGS 70 may add a trusted game's identity to the list of valid games when the game 80 connects to the server.

The PSGS 70 is a secure closed system that includes of a server and a series of client Machines 80. Communication between the PSGS 70 and the machine clients 80 can be conducted utilizing an industry standard format of XML-RPCs and can be encrypted using the SSL protocol.

A first level of authentication occurs when an initial connection attempt is made between the Machine 80 and the PSGS 70. If the Machine 80 has a valid public key, which corresponds to the server's private key, then access is granted. If it does not have such a key, then the authentication attempt is logged and the client machine is denied access to the PSGS 70.

In some very secure embodiments, to further enhance the security of the system, each client machine 80 must contain a valid entry in the PSGS 70 (i.e. it must be registered with the server). If so desired, the system administrator can configure the system to allow for machine self-registration. If this option has been enabled, on start-up the PSGS 70 will accept the credentials of the requesting machine 80 and make the appropriate entries in the PSGS 70 database.

An example startup process is as follows: At machine start-up the machine 80 sends a Machine Authentication message from a Message Controller (MC) to the PSGS 70. On receipt of the message, the PSGS 70 decodes the message, extracts necessary key information, and attempts a database lookup within the PSGS 70 database. If successful, the data retrieved from the database is utilized to construct a Machine Transfer message that is sent from the server 70 back to the MC on the sending machine 80. This message can contain pertinent location informational data (for example, positional data on the casino floor, whether or not PSGS functionality is enabled on this machine, casino specific art and sound, target souvenir information (position, description, value, etc.) The message is used to initialize the game on the machine 80 with specific parameters that customize the look, feel, and functionality for the casino property. If unsuccessful and self-registration is enabled, then the server 70 accepts the credentials of the machine 80 and utilizes them to make the appropriate entries in the PSGS database. It then grants access and sends back necessary configuration data. If instead self-registration is disabled, then the server will deny access to the PSGS 70.

Players may also have to be identified to have games that interact with the PSGS 70. Player identity, as described above, is gathered from a player tracking card that is inserted or otherwise read by the gaming device. Once the player identity is known, the PSGS 70 checks the identity with players who have data previously stored in the PSGS 70. Additionally, the PSGS 70 may contact other data sources that are connected to the PSGS but not necessarily stored in the PSGS to verify the player's identity, before that the particular player is allowed to connect to the PSGS system.

Even if the player identification data does not match exactly, for example an address or other data may have changed, the PSGS 70 can still allow the player to connect to the PSGS. In some embodiments, a database in the PSGS 70 is automatically updated with the new or changed information.

Database Structure for Multiple Resort Groups and Multiple Casinos

One or more databases stored in the PSGS 70 have been structured such that a single instance database can be utilized in many situations—such as in the following scenarios a single casino, a resort group consisting of multiple casinos, or a central hosting facility serving multiple resort groups and/or single entity casinos.

In one implementation, the casino can include a bank of machines communicating with the PSGS 70, which works well. If, for example, a spacious casino has a centralized data facility, all of the slot machines in Casino A and all of the slot machines in Casino B can communicate with a centralized data facility. Alternatively, a centralized facility could be separately hosted. In this scenario, a series of small independent casinos that are distinct and separate can all communicate with the central hosting faculty. They wouldn't have the expenditures of the data of the centralized hardware in the server room. Although the machines could all tie in to the centralized facility, as far as the casino patrons are concerned, they're going to see information and content specific to that casino, even though there may be data for more than one, or several, casinos stored in the central facility.

Each of the records or groups of records could be encrypted separately, with their own keys. Only the casino with the proper key could retrieve the proper data.

In some embodiments the database could be a Post-Gres operating on a Linux server.

Figure 6:
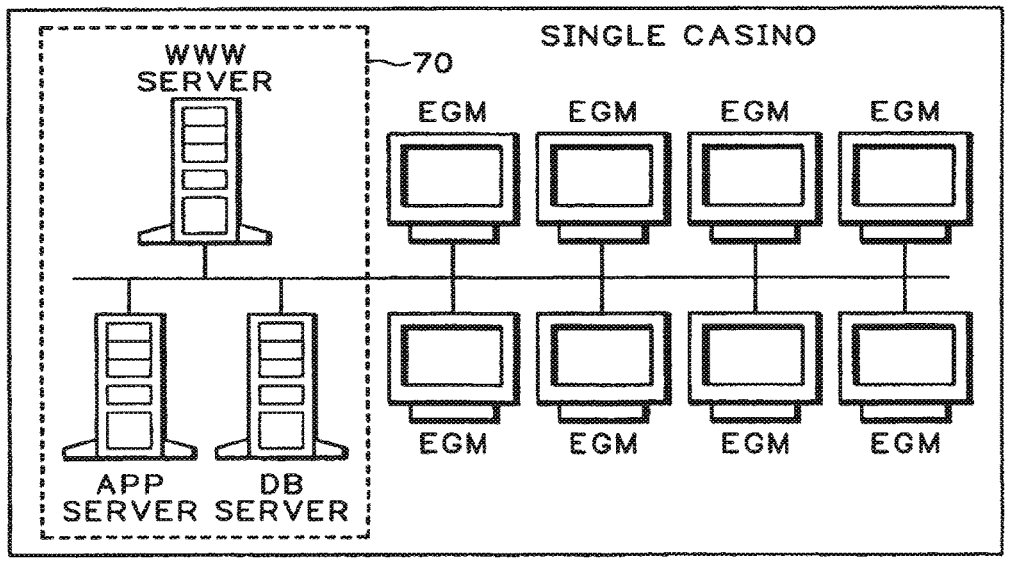
FIG. 6 is a block diagram of a personalization network according to embodiments of the invention operating on a single casino.

An example single casino layout is illustrated in FIG. 6. Under this scenario, an individual casino possesses a single PSGS system (which could, for instance, include a WWW server, an application server, and a database server) and hosts it within their facility. Any number of gaming devices within that property can be connected to and communicate with that specific PSGS server. System maintenance, scheduling, and configuration (for both the server and the individual gaming devices) can be performed through system maintenance web pages hosted on the PSGS server. User and patron administration (databases coupled to the PSGS 70) can be performed through web pages hosted on the PSGS server. Reporting can be also performed by this single PSGS server. Also, encryption in the database is performed using keys specific to that casino property.

Figure 7:
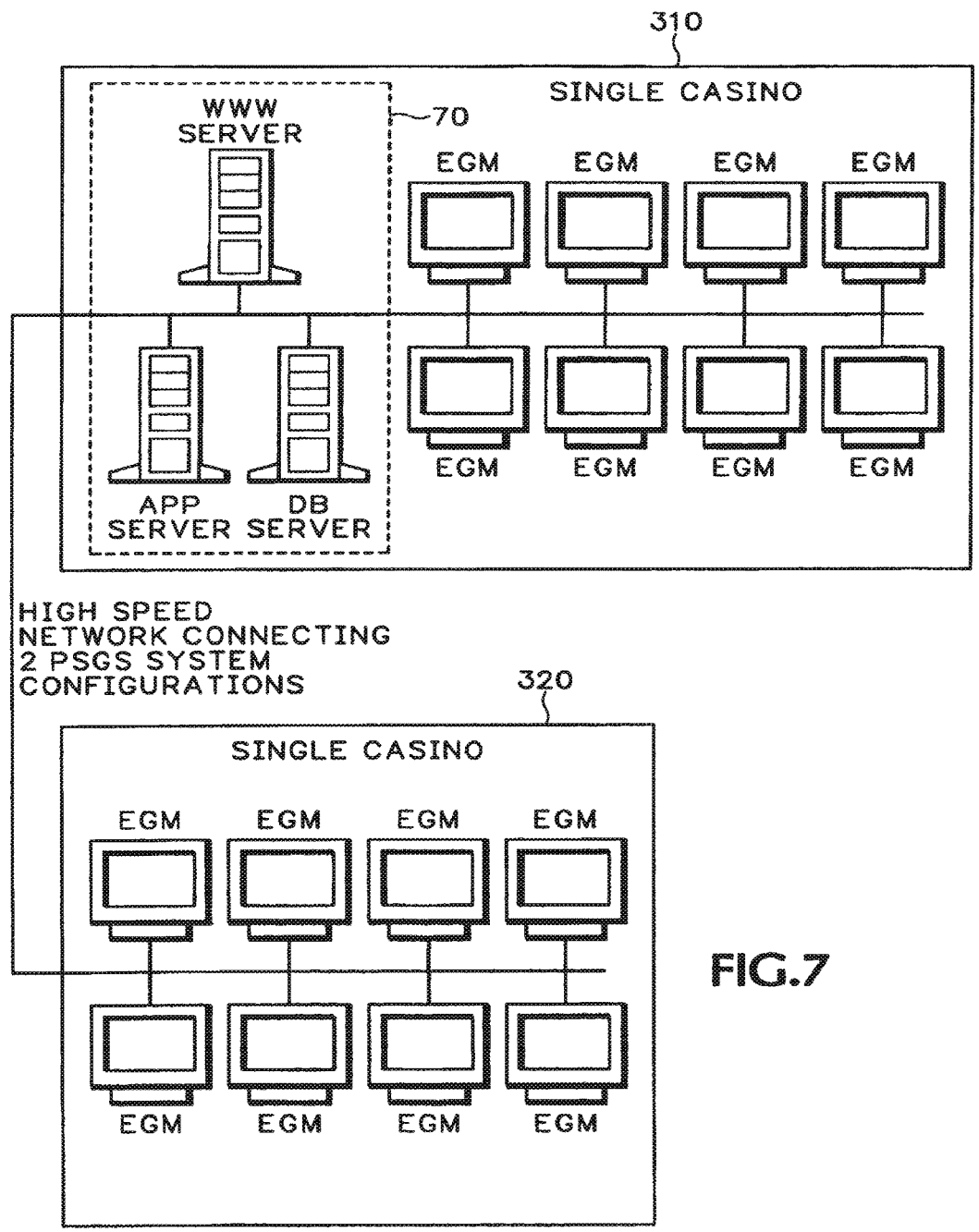
FIG. 7 is a block diagram of a personalization network according to embodiments of the invention operating on multiple single casinos.

An example multi-property configuration is illustrated in FIG. 7. Under this scenario, the PSGS system 70 is configured to support a single resort group of multiple casinos, illustrated as 310, 320. A resort group is an entity that maintains control over one or more casino properties. Each casino 310, 320 within the resort group meets the definition of a casino property under the previous scenario. Gaming devices from more than one property within a group are connected to and communicate with a specific, single PSGS server 70 hosted at a central resort group facility. System maintenance, scheduling, and configuration (for both the server 70 and the individual gaming devices), and for all properties within that group can be performed through the system maintenance web pages hosted on the resort group PSGS server 70. User and patron administration can be performed via web pages hosted on the PSGS server for all properties within that group. Reporting can likewise be accomplished from this single PSGS server for all properties in that resort group. Encryption in the database can be performed using keys specific to that casino property or (if configured) with a key specific to the entire group. Each individual casino property, if configured correctly, can independently configure and manage their individual assets. Each individual casino property, if configured in such a fashion, can be considered to be working in a virtual server configuration. Casinos have access to all patron management, machine management, and server management functions just as if they were operating on their own individual server.

Figure 8:
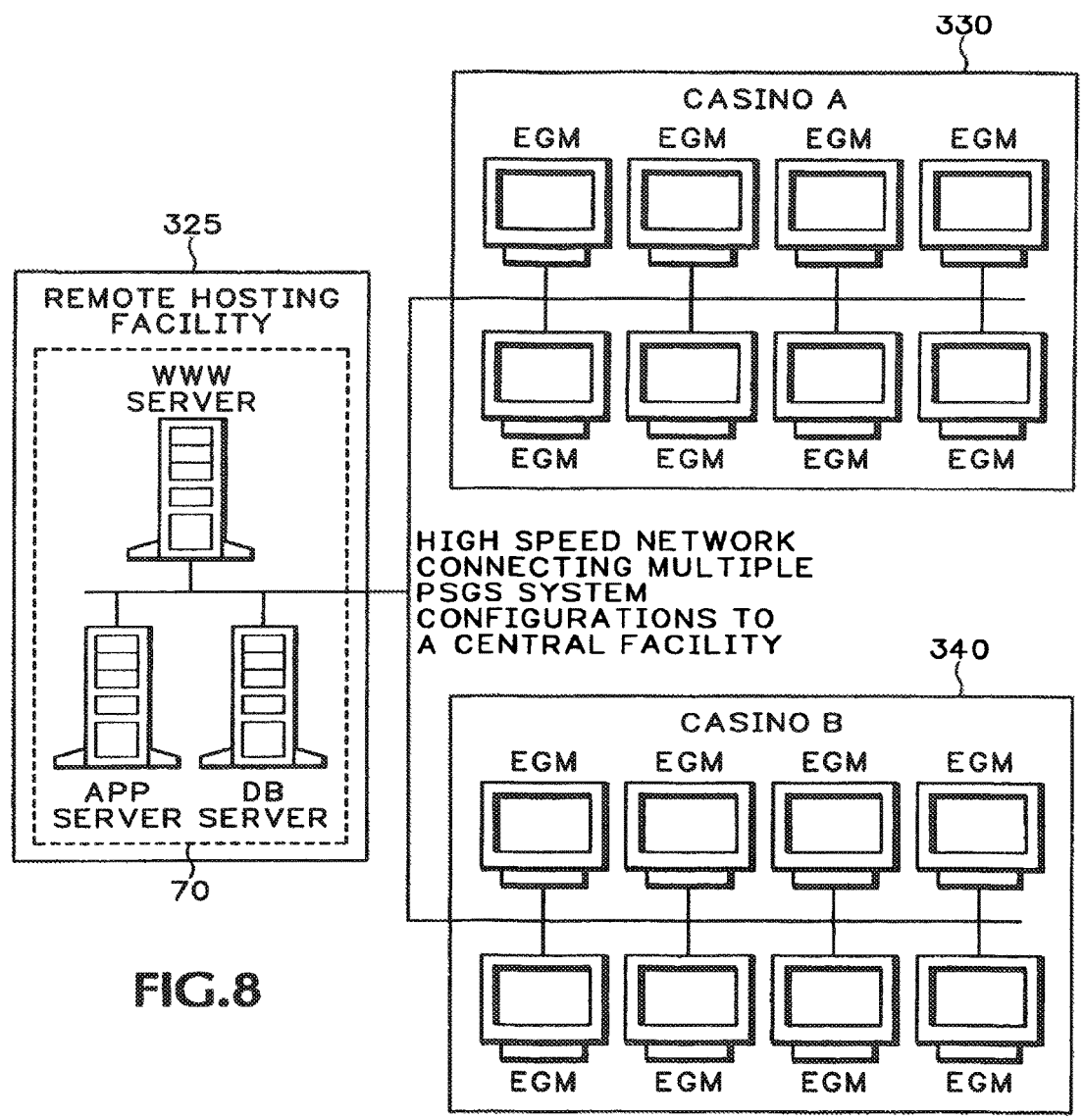
FIG. 8 is a block diagram of a personalization network according to other embodiments of the invention operating on multiple single casinos.

Another multiple property configuration is illustrated in FIG. 8. In that figure, multiple properties 330, 340 are serviced by a central hosting facility 325 including the PSGS server 70. Under this scenario, the PSGS servers 70 are configured to support multiple casinos and/or resort groups. Servers need not be located at the resort groups and/or casinos, 330, 340, but instead may be located at a central hosting facility. All other functionality as provided by the previous configurations is still provided. This scenario frees customers from cost and responsibility of maintaining and servicing day-to-day operations on server equipment.

Enhanced Messaging Capability

Enhanced messaging defines the messaging between the PSGS system 70 and the gaming device 80. In some embodiments, the PSGS server 70 communicates to a message controller 84 (MC), which is a process running on the machine 80, via XML PC. This is functionally illustrated in FIG. 1. In turn, and in some embodiments, the message controller 84 communicates to the game via Remote Method Invocation (RMI)

The message controller 84 acts as the "Traffic Cop" receiving, translating, and routing messages to the intended recipients. Its primary responsibility is to offload message processing from the game, freeing it to handle all game related activities.

When messages are received, the message controller 84 determines the routing for the message type, translates the message for respective receiver, and sends the translated message.

In some embodiments, the message controller 84 runs separately from the game machine 80, is started prior to game, bonus engine, etc. utilizing current AGPx start-up process, automatically restarts and re-establishes communications if it is terminated abnormally, and is responsible for receiving and dispersing messages to/from authorized/intended processes.

The gaming machine 80 may include a server, such as PostgreSQL, Tomcat, etc., and may include a LOL (Local Online) Card Reader Monitor, as described above. In some embodiments, the game machine 80 registers itself at start up with the PSGS server 70 via a message structure, accepts registrations from locally running processes (game, card reader monitor, etc.), utilizes the pre-existing game messaging format when communication with the game, and utilizes an industry standard XML based message format between the MC and the server processes.

A heartbeat, described above, can be maintained between the gaming machine 80 and the PSGS server 70, as well as between the message controller 84 and all other registered processes.

In some embodiments, the message controller 84 can function in two modes: normal, where all mandatory processes are present; where at least one mandatory process is missing and the message controller 84 is started in such a fashion to allow simulation.

Message Protocols

The following describes the messaging protocols utilized internally, between the message controller 84 and the gaming machine 80, and externally, between the message controller 84 and the PSGS server 70, within the architecture 10.

The message format between the game machine 80 and the message controller 84 is dictated by the current message format serialized message format. Communication between the message controller 84 and the game is via RMI Remote Method Invocation The message controller 84 will maintain an open messaging format to allow external applications the ability to interface with, and transmit messages to the gaming device for processing, as well as a closed format that would not be provided to outside parties, which will ensure integrity of the gaming system.

The XML format and protocol (XML-RPC) can be utilized by systems developed in languages other than Java.

All messages between the message controller 84 and external processes are preferably encrypted utilizing SSL. The message controller 84 will cache only a limited number of messages at the local level, because caching a large amount could be unsafe due to the possibility that a player could actually hit numerous bonus events and or reward redemptions during a communications failure. Under such a scenario, a player could in fact redeem his/her winnings then move to another machine and resume play. The PSGS 70 system would be unaware that the player had redeemed the awards and would resume play at the point where communications had failed. This, in effect, would provide the player with the possibility of redeeming rewards twice. With that in mind, only a very limited number of messages are allowed to go unacknowledged by the server before PSGS functionality shall be disabled.

If the PSGS 70 server does not respond before the message limit is reached, a message will be sent to the machine 80 disabling PSGS 70 functionality due to server non-availability. In case of a power failure on the game machine 80, the message controller 84 should be able to retain the message log and resynchronize with the server once it is available.

Many different message types are possible between the game machine 80 and the PSGS server 70, such as the following example message types:
  Acknowledgment (PSGS)
  Alarm Message (Game)
  Alarm Message With Value (Game)
  Bonus Award (PSGS)
  Bonus Redemption (PSGS)
  Button Message (Game)
  Command Message (Game)
  Connect Message (Game)
  Credit Message
  Game State Message
  Heat Beat
  Keep Alive
  Machine Authentication (PSGS)
  Machine Transfer (PSGS)

Message (Base)
Message Filter
Mouse Message (Game)
Patron Authentication (PSGS)
Patron Bet (PSGS)
Patron Bet Response (PSGS)
Patron Transfer (PSGS)
Promotional (PSGS)
Random Draw (Game)
Registration (PSGS)
Server Error (PSGS)
Session Begin (PSGS)
Session End (PSGS)
Session Transfer (PSGS)
XML Message (Base)

External Data Mining/Dynamic Content Generation

Using embodiments of this invention, dynamic content can be delivered to a game 80 that is based on specific player and/or casino preferences. A "my calendar" concept, which is a calendar that is tailored to a particular game player is a natural outgrowth of this dynamic data mining process.

Utilizing this approach, the PSGS 70 would be granted access to external data sources through in-house integration efforts (providing direct access to data) or through traditional screen-scraping techniques where data is derived from published sources, such as predefined web pages.

Examples of such integrations include: a tie in to the Sports Book market, which would provide a way of filtering data, such as displaying sports data on the gaming screen (or an area of the game screen) to a player of a gaming device in real time, while the player is in the midst of slot (or other game) play. This could take the form of: event start/finish/game outcomes, win notifications, etc., i.e., displaying the notifications on the game screen, and bringing this data to the player's attention in the form of banner messages or pop-ups. The tie in could become a two-way operation and bets could be taken for events w/o having the player leave the comfort of his/her slot machine. Once betting information was placed on the machine display 82, bet buttons could accept a player's input and cause the bet to be made. Funds could be debited from the meters on the gaming machine 80, or from a pre-established credit line (or deposit account) with the casino.

A tie into other areas of casino operations could also be accomplished. Examples of these could be announcements of: upcoming bingo sessions, upcoming future and results of past keno games, availability of poker seats in poker rooms, restaurants/show reservations.

One appealing aspect of this customization is that through the use of a player tracking card, the casino knows exactly who and where the card holder is, and can target a message directly to the card holder . . . and not broadcast the message to an entire casino or to an entire bank of machines.

With a two-way flow of data between the gaming machine 80 and the PSGS 70, the architecture 10 can provides for, for example, making reservations for dining/events by using the gaming screen, checking a player club status, etc by using the gaming screen, and checking airline flight status by using the gaming screen, etc.

By extending this data mining/integration concept onto the PSGS server 70, the ability to link these systems together is enhanced, which provides the player with a "portal" into their casino/gaming experience.

Figure 9:
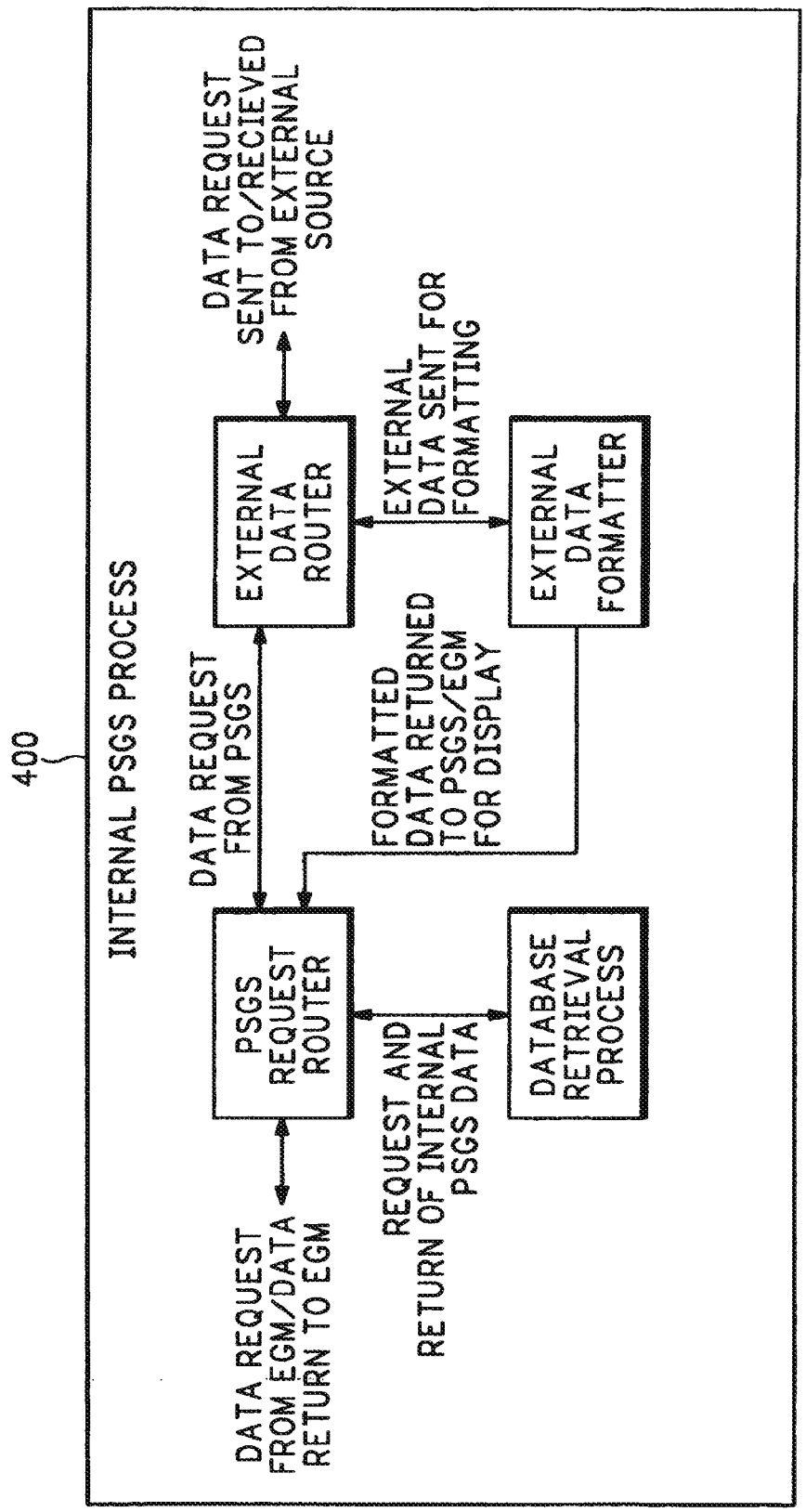
FIG. 9 is a process flow diagram illustrating how the personalization network according to embodiments of the invention can acquire data.

An example PSGS system 70 can consist of a server (or series of servers) connected to a series of slot machines, as described above with reference to FIG. 6. Additionally, a secondary data mining/routing process 400, such as a system illustrated in FIG. 9 is installed on the PSGS server 70 and operates on an application server to access external data sources, mine the available data, and bring it back to the PSGS 70 for formatting and display.

In some embodiments, a dynamic content generator 76 (FIG. 1) operates on the PSGS server. When directed, the dynamic content generator 76 would initiate a servelet, for example, which would query an external data source, build up the content and bring it back and display it.

The dynamic generator 76 could filter information before providing to the screen of the gaming device. In one embodiment, a "my calendar" button could appear on the gaming screen 82 that, when selected, causes the dynamic content generator 76 to get public and private events, format them, and display a calendar for the player.

To generate the calendar, or any other outside content, the dynamic content generator 76 could go to any external source for data content. In addition, the data could be made to flow in two directions, so that the player could generate data that is delivered to the PSGS 70 network or to other connected networks. For instance, the gaming device could be linked to a casino's sports book operation and bring over some sports book information, including game scores, etc. The player could place bets and the bets placed with a casino's sports book. A player could hook into a scheduling system for poker tables so that when a poker table that came available, the table could get pushed to the player and a notification would appear on the player's game screen. Show, dinner, or transportation reservations could be made.

In another embodiment, a player could check into a hotel before the player's room was ready. Then, after the player inserted his or her card in the gaming device 80, the PSGS 70 system could communicate with the hotel open room system, and could send a message to the player when his or her room was ready, and even specify the room number or any additional information, for instance.

Such notices could be placed on a particular portion of the game screen 82, for instance, or could be made into a pop-up message that appears over the screen. Of course, the popup would not interfere with an existing game, such as by waiting until the end of a turn or a game before popping up on the screen.

Figure 10A:
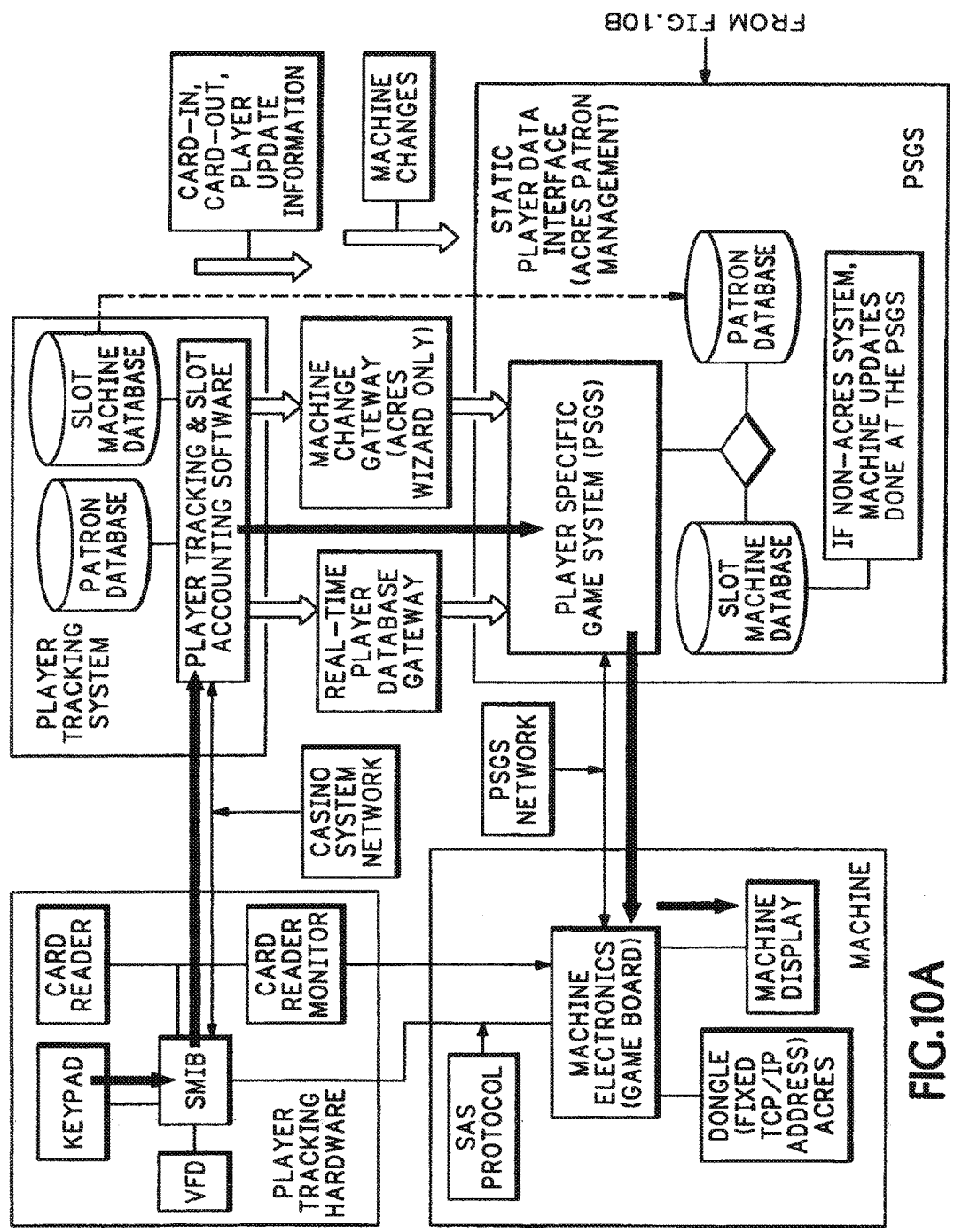
FIGS. 10A and 10B are a block diagram illustrating how information can be flowed across the network of FIG. 1.
Figure 10B:
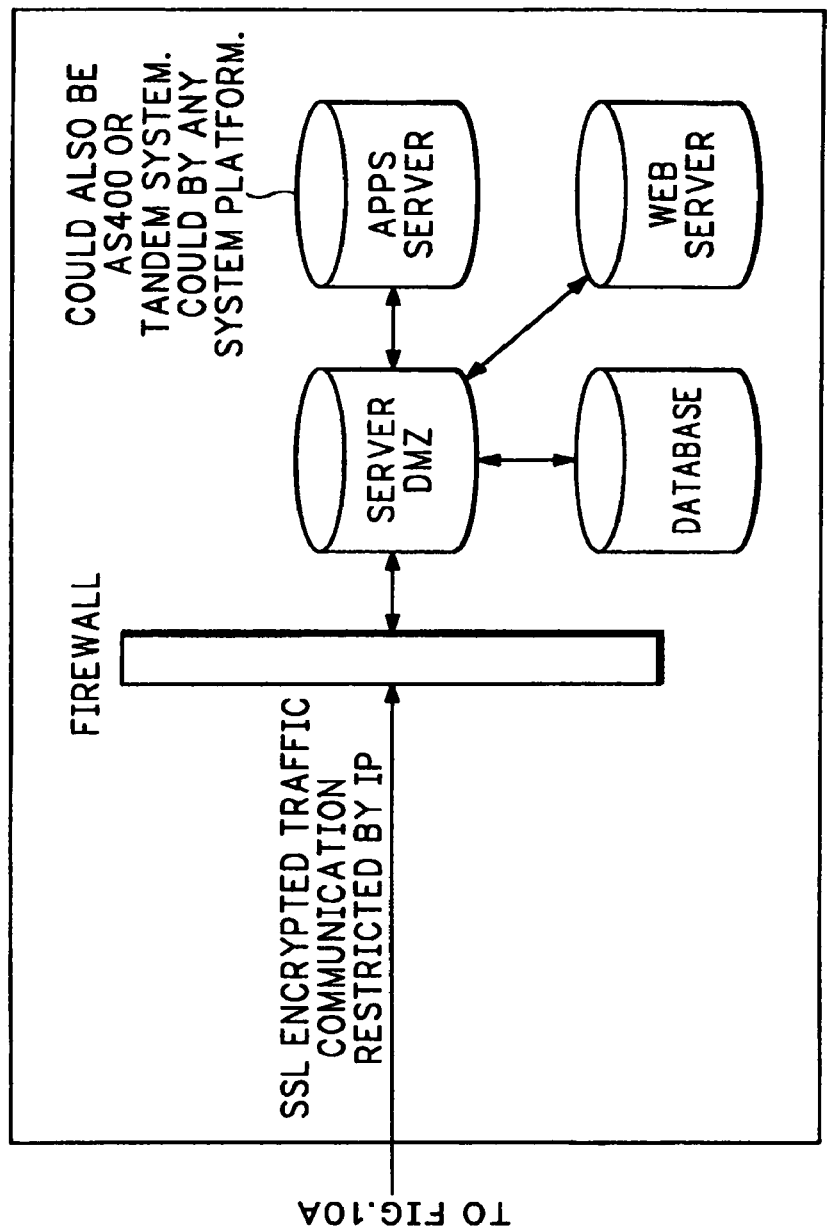

FIGS. 10A and 10B illustrate another method of connecting the PSGS to a website external from the game network.

Figure 11:
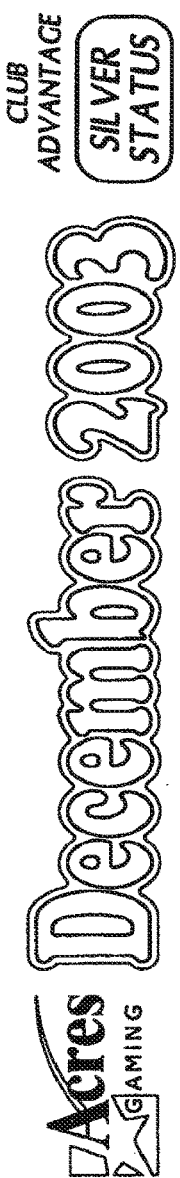
FIG. 11 is an example of a personalized calendar according to embodiments of the invention.

Currently, games and gaming systems operate in closed environment and do not allow outside content to be displayed or allow for dynamic information and content. The idea of having a system like above is that it allows for other systems to "speak" to the game using a communication protocol such as XML. As mentioned above, some of the benefits of this type of application are listed below: streaming information personalized to the player's tastes. I.e. streaming stock quotes, sports scores, allowing a customer to make sports wagers on the game. For instance, a ticket printer, known in the art, could print the sports betting ticket and bill valuator could redeem the winning ticket. Such a system could notify the customer of upcoming bingo sessions. Such a system could take keno wagers and allow the customer to review past and current results. A ticket printer could print the ticket and the validator could redeem the ticket. In such a system the customer could be notified of a poker room table opening up and their status on the wait list. The customer could access a calendar of events, such as that illustrated in FIG. 11. The calendar could detail events the public is aware of and private invents that are invite only, for instance.

The customer could access information about their points, comps, and cash back. The customer could make and review reservations for dinning, rooms, poker tables and special events. The system could allow for player specific tailored advertising messages. These messages could be simple text or complex animations.

Heart Beat Monitoring

A heart beat monitor operates within the machine 80 that is able to be coupled to the PSGS 70 system. This monitoring system gives the PSGS 70 the knowledge that the EGM is alive and has not been compromised by any problems.

In practice, the heart beat is a message format that is sent to ensure that all the components of the machine 80 are still active. If the components of the machine 80 are not up and active enough, the PSGS 70 will disconnect the machine 80 from the system or will send commands to shut down the machine. In this way, no player would continue to play on a machine that is not connected to the PSGS system 70.

Such a message could be sent at any time period, such as, for example, every thirty seconds. Many components could be polled, for example messages could be sent to the game, the card reader monitor 24, and/or the server 70. If any one of those components drop out, the heart beat monitoring system can disable PSGS functionality.

The heart beat monitor can be a process running on the game 80 processor, which communicates with other software processes or hardware processes within the game, within the PSGS server 70, or elsewhere on the architecture 10.

The following points can be considered. This process is defined as the monitoring of critical system components on a fixed interval basis. If that heartbeat is lost, predefined steps can be taken to either continue operations in a secure mode or perform an orderly shutdown of the system. In the case of the PSGS 70 system, the primary purpose is to insure the robustness and reliability of the overall gaming system. It is critical that the player be assured that contributions derived from coin-in are attributed to their session/account in a timely and accurate fashion.

Generally, this monitoring occurs between certain critical system components. In the case of a dual server solution, a heartbeat is maintained between the two servers such that the "standby" server can assume responsibility if the heartbeat is lost with the "live" server. In the case of the PSGS 70, this monitoring occurs between these major internal and external system components: game (internal to machine 80), message controller 84 (internal to machine 80) Card Reader Monitor 24 (internal to machine 80), PSGS server 70 (external to machine 80).

As defined in the configuration options, a heartbeat message is sent between all major components every n seconds. The component, upon receipt of the heartbeat message, must respond within n seconds with an acknowledgement (Ack) message. If a response is not received, the sending component is responsible for notifying the local controlling authority that communication has been lost and PSGS functionality should be disabled.

Figure 12:
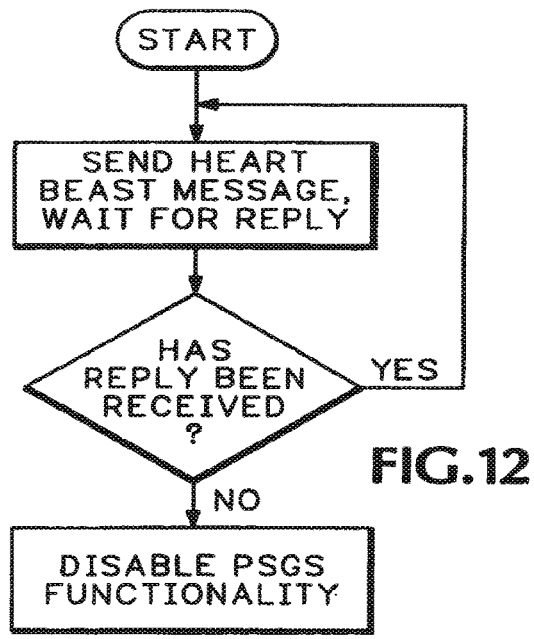
FIG. 12 is an example flow diagram illustrating a heartbeat process.
Figure 13:
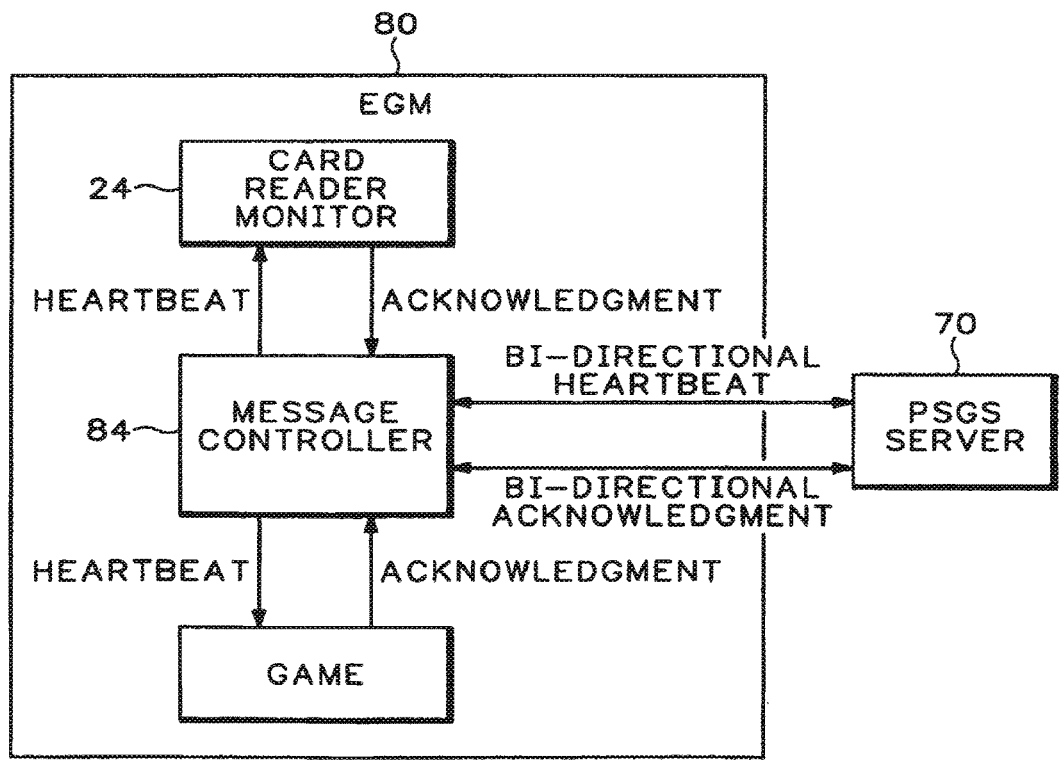
FIG. 13 is a block diagram illustrating how heartbeat messages can be propagated across a personalization network according to embodiments of the invention.

An example basic logic flow of a sample heartbeat between 2 components is illustrated in FIG. 12, and an example message flow diagram is illustrated in FIG. 13.

Representative examples of a message flow is as follows: Successful Message Controller to Card Reader Monitor transaction:

1) Message Controller 84 sends heartbeat to Card Reader Monitor 24
2) Message received by Card reader monitor 24 and acknowledgement message sent back to Message controller 84.
3) Message received by MC and no action taken. Unsuccessful Message Controller to Card Reader Monitor transaction:
1) Message Controller (MC) sends heartbeat to Card Reader Monitor (CRM)
2) Message either received by CRM and acknowledgement message sent back to MC and not received or message never received by CRM
3) MC takes appropriate action by sending message to Game disabling PSGS functionality.
4) Game initiates PSGS disable
5) Simulates card-out
6) Notifies player of loss of communication
7) Sends session data to server and closes out session Upcoming Event Indicator Different bonuses provide incentive for someone at a gaming machine to play additional games. In embodiments of the invention, an indicator may be presented on the gamescreen 82 when a bonus or other type of event may occur in the near future. Thus, when the player sees the indicator, they may be enticed to stay at the game longer and wait for the event to occur.

A lucky coin bonus is a bonus in which an award is won by a player after a randomly selected amount of total play has occurred on participating machines. Such bonuses are well known in the industry and appear in, for example, U.S. Pat. No. 6,375,569.

A lucky coin indicator is a type of upcoming event indicator, which, as described above, is a visual indicator of the lucky coin bonus that is presented to a player when the player is playing a gaming device.

In one embodiment, the indicator appears on the gaming screen on one of three conditions. In the example illustrated in FIGS. 14-16, the indicator is presented as a bird that flies across the gaming screen, or performs other actions.

Figure 14:
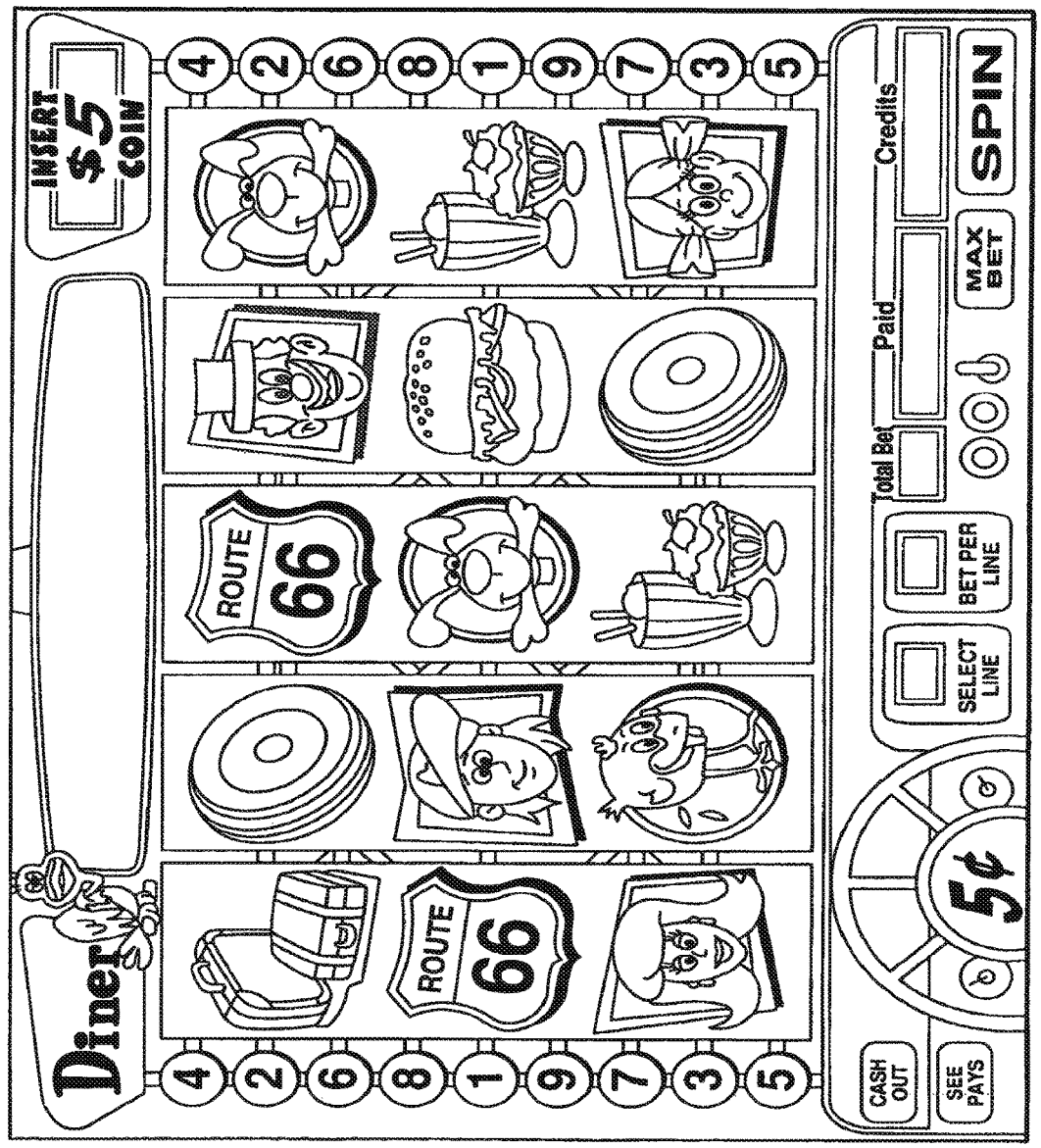
FIG. 14 is a screen shot of an anticipation indicator.

For example, as illustrated in FIG. 14, a lucky coin identifier communicates to a player that a bonus may be awarded at any moment. In the case that the indicator is based on information stored somewhere on the architecture 10, the game 80 can make the decision to trigger the animation based upon the stored data. For instance, the bird may move when the card is inserted into the gaming device 80. This one method for such a PSGS 70 system, but is not the only method available.

Figure 15:
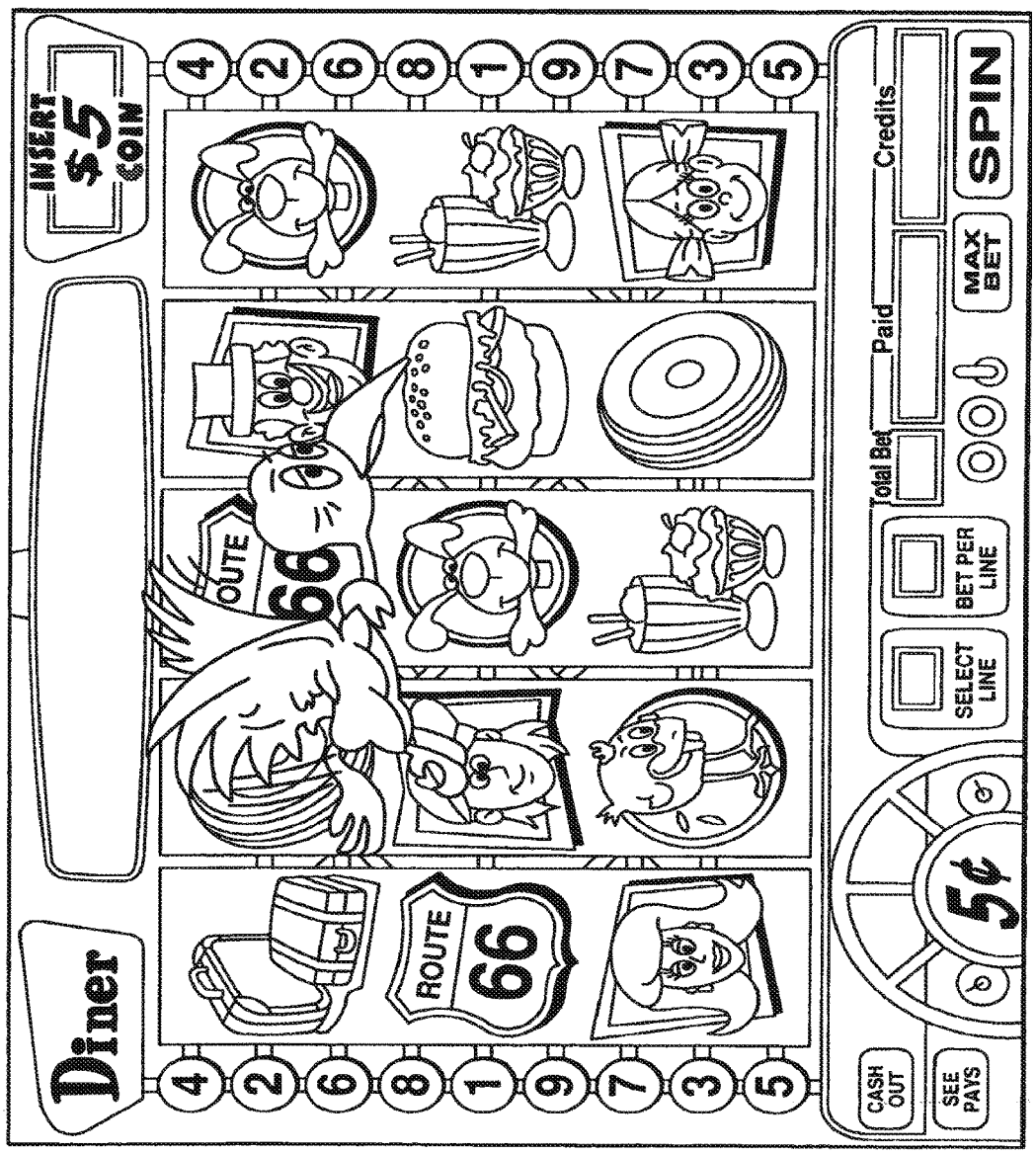
FIG. 15 is a screen shot of an animated anticipation indicator.

As illustrated in FIG. 15, the bird can move based upon any number of factors, such as: coin-in, games played, time, random times, specific game outcomes, sets of game outcomes, consecutive game outcomes, X outcomes in Y tries, outcome sets/unit time, outcomes relative to others, number of points earned, gross win/loss, win/loss per unit time, visit frequency, handle per trip, handle per unit time, continuous play, at a lucky time, and with an electronic drawing. In FIG. 15, the bird is flying by but not initiating a bonus. In this picture the bird is simply reminding the player that they qualify for a lucky coin bonus. In such a system, the player may be enticed to play additional games or play at the gaming machine 80 for a longer time if they believe a bonus or other advantage will be awarded shortly.

Figure 16:
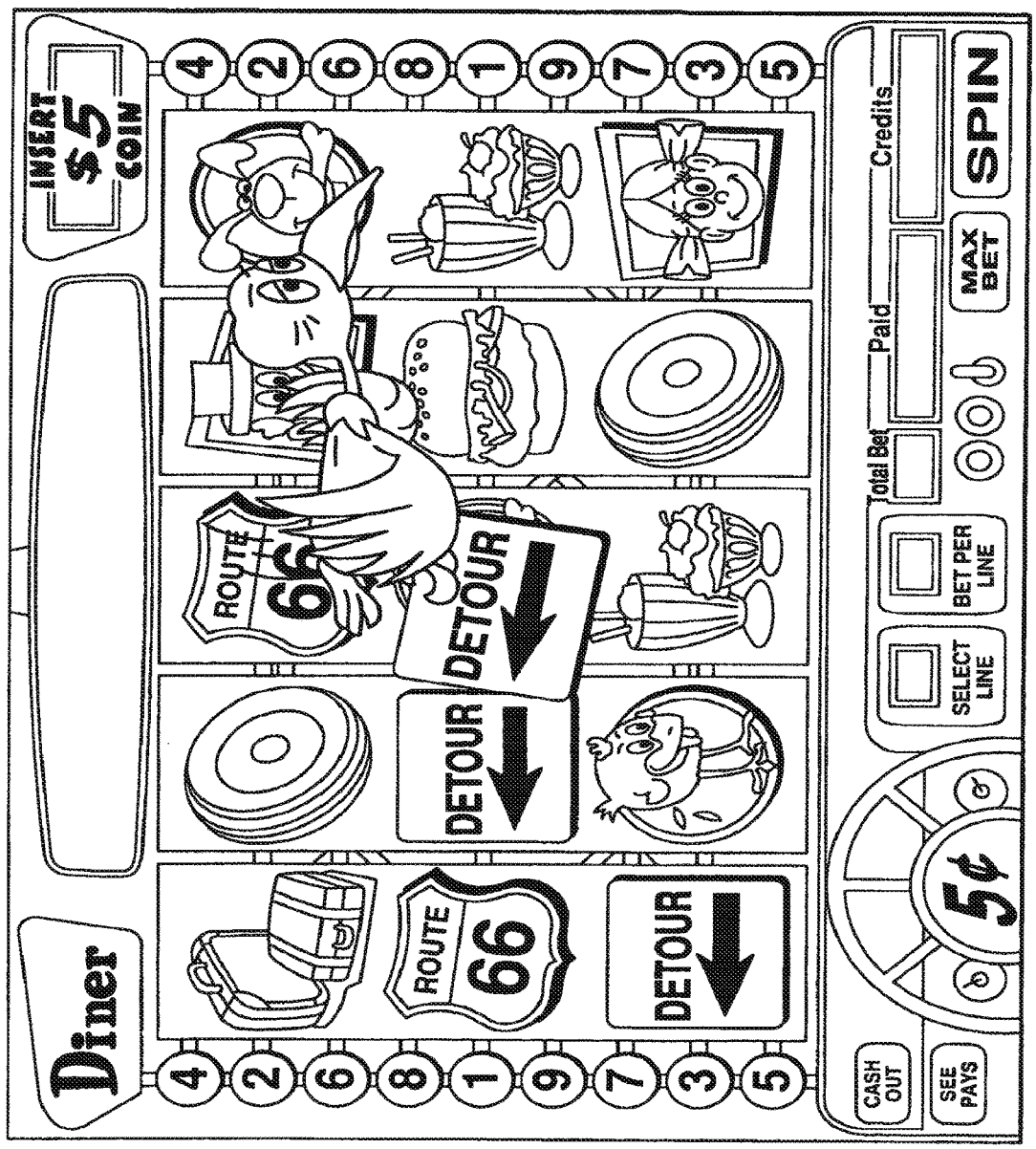
FIG. 16 is a screen shot of an animated bonus indicator.

As illustrated in FIG. 16, the bird dropping something, such as detour signs, indicates the initiation of the bonus. By dropping the detour signs as if they were symbols, the game feels familiar to the customer. The advantage of this process is that a customer no longer has to be confused about why they won a mystery or lucky coin award. The vulture reminds them of the award and creates a perceived rhythm to the awarding of the lucky coin award.

The indicator could be used to signal impending or immediate awarding of other awards. For example, it could trigger a redemption box to redeem collected souvenirs.

Game Verification

Because the game 80 may not be directly connected to the PSGS 70 system, game verification is a unique way of ensuring that the proper game is connected to the PSGS network 10. This verification can be performed by a secure Java classloader and an in-memory verification.

In embodiments of the invention using a Java Classloader, each class is loaded up into the JVM goes through a check first, and a signature, is computed. The signatures are then checked against known good signatures that have been pre-computed and stored in a non-volatile memory. In some embodiments, a hash mark check sum value of a signature is performed on each class. In this process, as the machine is powered up, a process runs that computes a signature on a CD that is present in the game. The signature is compared to a pre-calculated signature stored in non-volatile memory, for example an EEPROM. If it matches, the game proceeds to the next stage of the verification. If the signatures do not match, the game is prevented from connecting to the PSGS 70 network.

In embodiments of the invention using in-memory verification, a list of standard processes that are authorized to be running on the machine are sampled every so often, for example every few seconds, and a query is made to the proc-file system, which is built up a list of processes. The authorized list is compared to the proc-file system. If the lists match, then the machine is authorized. If they do not match, the machine is shut down, or disconnected from the PSGS network 70.

In one embodiment, the entire list of processes is memorized, then each process is independently verified. In some embodiments, the unique signature is derived based on the file name, the path, the command line parameters and other pertinent information.

Additional details of both the memory verification and the Java classloader are illustrated below.

A basic requirement levied by gaming regulators is for the continual verification of memory utilized by a gaming machine 80. The basic premise behind this is that the known "memory map" is constantly being compared at a byte level to a known good and that if the maps differ, the game will fault.

Since the gaming machine 80 can utilize a dynamically loading operating system, it is virtually impossible to predict what will be loaded where (and at what time). As such, an alternative method can be used.

Implementation

Implementation of verification utilizing a /proc file system is a two step process. The first step is accomplished at build time and the second step is accomplished at runtime.

At build time, a list of authorized processes is derived from a test configuration of the game. This is combined with the known operating system processes that are authorized to be running on the game machine 80. Once the combined list has been created, it is run through a series of custom applications used to extract information about those processes (process name, invocation path, command line parameters, memory utilization, etc.). This information is then used to create a unique signature for each process. Once the series of unique signatures has been created it is stored on EPROM for future utilization.

At run time the /proc system is continually accessed to derive a list of processes that are active at that moment in time. Since not all processes are guaranteed to be active at all times, a direct one for one comparison cannot be made. Instead, a signature for those processes that are currently active is derived using the same techniques as used at build time. After the signature has been derived, the corresponding signature is extracted from the EPROM and is compared. If the signature matches, the game continues on. If it does not match, an entry is made to the system log and the game faults. If, during the process of extracting a signature from the EPROM, one cannot be found for the process currently in memory, the game will fault.

Java Classloader

The purpose of System Verification is to continuously check that the gaming device is in a known state—a known state being that known and only known processes are running and that known and only known Java classes are being executed.

During game execution three pieces come together for the successful verification needed to allow the game to continue to execute: the CD that the game code and data are delivered on, the security prom which must be matched with the CD, and the run time environment of the executing game.

The CD contains all executables and data needed for game execution. The changes to CD from previous version of this platform to support system verification is the additional code to track and verify classes and processes loaded into the run time environment. The CD is stored within a game cabinet, outside the reach of patrons.

The security prom contains checksums and signatures to verify the validity of the CD. The security prom could contain an MD5 checksum of the entire CD to ensure a valid CD was loaded. This data remains in place and still actively verifies that the CD and security prom loaded on this machine are indeed a matched set. The security prom can also include the class and process signatures required to support system verification. A seed used to create these signatures is determined during the build process and is unique to each revision of CD/prom pair.

The run time environment has 2 additions to support System verification; 1) code to track which classes and processes are currently loaded into the runtime environment and 2) code to generate signatures for these loaded classes and processes and compare the active signatures with the known signatures located on the security prom. If the signature of any active class or process does not match that on or is not found on the security chip error messages are logged and the game is terminated.

Prom Setup

The signature data for verification is added to the 'security' chip on the prom board. There are now four (4) sections to the prom image: md5 checksum, md5 executable, class signatures, and process signatures. Each section has 4 bytes of size (size of data only) followed by the actual data.

Md5 Checksum:

This file format remains unchanged from previous versions. This image contains one line per file where each line contains a md5 check sum and the file name and one additional line to define the game/percentage this machine can run.

There is a special provision on the md5 checksum where if the size is equal to "!agp" then there is no md5 checksum data and the system is deemed to be a development machine (md5 checksum verification is disabled).

Md5 Executable

This image starts with a few lines to define the game/percentage this machine can run. The rest of the file contains one line per file where each line contains a md5 check sum and the file name.

Class Signatures

This section is in the security prom to support System Verification. This section contains the name and a signature for each class that is allowed to be loaded while the game is executing.

Process Signatures

This section in the security prom supports System Verification. This section contains the name and a signature for each process that is allowed to be running while the game is executing.

Startup

Given the security of the JVM there is no way to extract the active classes out of the JVM itself short of opening up gaping security holes and adding the performance hit of enabling the debugging mode of the JVM. To keep track of which classes are currently active we add our own class loader to both load and track active classes. We tell the JVM to add our class loader into the class loader structure with the—Djava.system.class.loader=classloader. VerifyClassLoader argument on the JVM startup command.

Our class loader was created by starting with the most secure of the available Java class loaders, adding more restrictions to the sources from which classes can be loaded from, and adding the ability to remember each and every class that is loaded into the JVM. At startup we explicitly specify to the JVM the location and name of our custom class loader.

The JVM class loading is done in a parent-child relationship with the default loader the parent and added class loaders the children. The default class loader is always present and our class loader becomes the only child class loader. When the JVM is asked to load a new class it calls the parent class loader which looks for all classes available in 'CLASSPATH'; if the class is not found it then delegates the loading of the class to the child class loader. In order to effectively disable the parent class loader we modify the startup to set 'CLASSPATH' so that it does not point at any classes forcing the default parent class loader to always delegate to our class loader.

Finally we add the argument '-Djava.system.class.loader.path=/cdrom'(/space/target for development systems) to the startup which tells our class loader where to look for known classes. No special startup code is needed for process verification.

Run Time Checking

Runtime verification is accomplished by creating a verification thread within the ATM. The thread performs verification on demand or 60 seconds later than the last verification. Currently on demand verification is done on a door closed event or a jackpot cleared event.

The verification thread creation and on demand kicks are done in the BaseGame object. The verification thread calls back to the destroy method of BaseGame if verification fails and the verification is not tagged as being in development mode. The verification thread handles timing and the interface between the game and the verifier code. The actual verification of active classes happens in the classloader and process packages. The basic verification is to read the class signatures off the security chip and compare these expected signatures to those of the currently active classes which are tracked within our custom class loader. If a signature mismatches or an active class does not have a signature in the 'security' chip the verification fails and the game is shut down (it only babbles in developer mode).

The actual verification of active processes happens in the process packages. The basic verification is to read the process signatures off the security chip and compare these expected signatures to those of the currently active processes which can be gathered from the Linux kernel. If a signature mismatches or an active process does not have a signature in the 'security' chip the verification fails and the game is shut down (it only babbles in developer mode).

System Terminal Support for System Monitoring

Casino and player satisfaction often hinge on very similar requirements; robustness of game play and reliability of the gaming platform. In the past, if there was a fault and/or discrepancy in the gaming platform's performance, it was often difficult if not impossible to narrow down and rapidly find the cause without extensive (and often on-site) efforts of development staff.

The need exists to rapidly detect, diagnosis, and "treat" the symptoms of an Electronic Gaming Device (EGM). To accomplish this: a remote monitoring capability is installed on the gaming machine 80; and remote access is attained, preferably in a secure and reliable manner.

Remote access uses networking support, which necessarily opens as a possibility for intrusion. As such, a secure system is incorporated to authenticate the requestor as a valid user who is authorized to perform actions on this device. SSH is an industry standard protocol suited for just such a task.

Using SSh allows a connection to be made into a gaming device from a remote location, and allows monitoring activity to occur on that gaming device. OpenSSH is a suite of tools to help secure network connections. A list of features includes: strong authentication. Closes several security holes (e.g., IP, routing, and DNS spoofing), Improved privacy—all communications are automatically and transparently encrypted, secure X11 sessions—the program automatically sets DISPLAY on the server machine, and forwards any X11 connections over the secure channel, Arbitrary TCP/IP ports can be redirected through the encrypted channel in both directions (e.g., for e-cash transactions). No retraining needed for normal users. Never trusts the network. Minimal trust on the remote side of the connection. Minimal trust on domain name servers. Pure RSA authentication never trusts anything but the private key.

Client RSA-authenticates the server machine in the beginning of every connection to prevent trojan horses (by routing or DNS spoofing) and man-in-the-middle attacks, and the server RSA-authenticates the client machine before accepting .rhosts or /etc/hosts.equiv authentication (to prevent DNS, routing, or IP-spoofing). Host authentication key distribution can be centrally by the administration, automatically when the first connection is made to a machine. Any user can create any number of user authentication RSA keys for his/her own use. The server program has its own server RSA key which can be automatically regenerated every hour. An authentication agent, running in the user's laptop or local workstation, can be used to hold the user's RSA authentication keys. The software can be installed and used (with restricted functionality) even without root privileges. The client is customizable in system-wide and per-user configuration files. Optional compression of all data with the compression tool gzip (including forwarded X11 and TCP/IP port data), which may otherwise result in significant speedups on slow connections.

Complete Replacement for rlogin, rsh, and rcp

Anyone who has access to any machine connected to a non-encrypted network can listen in on any communication. This is being done by hackers, curious administrators, employers, criminals, industrial spies, and governments. Some networks leak off enough electromagnetic radiation that data may be captured even from a distance.

If, during log in, a password would go to the network in plain text, any listener could use your account to do any evil he likes. Many incidents have been encountered worldwide where crackers have started programs on workstations without the owner's knowledge just to listen to the network and collect passwords. Programs for doing this are available on the Internet, or can be built by a competent programmer in a few hours.

Many companies are not aware that information can so easily be recovered from the network. They trust that their data is safe since nobody is supposed to know that there is sensitive information in the network, or because so much other data is transferred in the network. This is not a safe policy.

Utilizing OpenSSH as a foundation for remote access and monitoring of the EGM provides a baseline which mitigates this risk.

Access

At startup, each gaming machine 80 as part of the init (boot) process starts an SSH server. This server continually runs in the background as a server process listening for and responding to requests for access from external sources.

A client application (external to the gaming machine 80) will attempt to connect to the gaming machine 80 via ssh. The following general steps are followed to gain access:

The application (most often a request for a simple login terminal) is authenticated via a comparison of the public/private keys. Access is granted if: the keys are found to be authentic, and the requesting individual has an account on the EGM, the requesting individual provides the proper password, and the resource requested exists on the EGM.

Local Monitoring

Once authenticated access to the gaming machine 80 has been gained, a variety of applications can be accessed to perform forensic diagnosis on the machine. The user could:
View game specific logs
View system specific logs
View currently running system and user processes
View system resource (memory) utilization Remote Monitoring Remote monitoring can also be accomplished by the installation of applications on the gaming machine 80 which receive requests for and transmit status information to external monitoring systems. Representative examples could be:
Game Status
Overall System Status (processes, memory utilization, etc)
Example Peripheral status:
Printer (online, paper low, etc)
Hopper status (hopper online, hopper full, etc)
Bill Stacker (stacker full)
Touchscreen active
Sound system active
All requests would go through the same ssh authentication process as described above since (in this case) ssh would be used as a tunneling protocol to allow internal process A and external process B to communication of a secure and encrypted pipeline.

In some embodiments, a special chip can be installed in a gaming device that can allow remote access to a gaming machine only if the special chip is present. For example, the special chip or code can indicate that the game is in a "developer" mode, and only allows secure access into the gaming device if the developer chip is present in the gaming machine.

The invention is claimed as follows:

1. A gaming system comprising:
a card reader configured to receive a player-tracking card and to read machine-readable indicia on the player-tracking card;
at least one processor; and
at least one memory device that stores instructions that, when executed by the at least one processor, cause the at least one processor to
after the card reader receives the player-tracking card and reads the machine-readable indicia on the player-tracking card, send a player account identifier that is based on the machine-readable indicia and that is associated with a player account to a server to enable the server to initiate a gaming session;
receive a maximum value, a minimum value, and an increment rate from the server;
as activity occurs on the gaming system during the gaming session, increment an actual value associated with the player account towards a target value at the increment rate, wherein the target value is between the minimum value and the maximum value;
responsive to the actual value reaching the target value during the gaming session, cause a first award to be provided;

responsive to a second award condition being met, cause a second different award to be provided, wherein the second award condition being met depends on the first award having been provided; and responsive to removal of the player-tracking card from the card reader, send a card out signal to the server to enable the server to terminate the gaming session.

2. The gaming system of claim 1, wherein the first award includes a qualification to win the second award.

3. The gaming system of claim 2, wherein the second award condition is met when a designated period has passed after the first award has been provided and another gaming session is initiated based on receipt of the player-tracking card by the card reader.

4. The gaming system of claim 3, wherein the instructions, when executed by the at least one processor, cause the at least one processor to randomly determine an amount of the second award.

5. The gaming system of claim 4, wherein the second award includes one or more promotional credits.

6. The gaming system of claim 1, wherein the first award includes an opportunity to win a drawing ticket.

7. The gaming system of claim 6, wherein the instructions, when executed by the at least one processor, cause the at least one processor to, after the opportunity win the drawing ticket has been provided, determine whether to cause the drawing ticket to be provided based on a random determination.

8. The gaming system of claim 7, wherein the second award condition is met when one of the player's drawing tickets is randomly selected during a drawing.

9. The gaming system of claim 1, wherein the first award includes associating one of a plurality of spots of a game board with the player.

10. The gaming system of claim 9, wherein the second award condition is met when the spot associated with the player is randomly selected during game play.

11. A method of operating a gaming system, the method comprising:

receiving, by a card reader, a player-tracking card;

reading, by the card reader, machine-readable indicia on the player-tracking card;

sending, to a server, a player account identifier that is based on the machine-readable indicia and that is associated with a player account to enable the server to initiate a gaming session;

receiving, from the server, a maximum value, a minimum value, and an increment rate;

as activity occurs on the gaming system during the gaming session, incrementing, by at least one processor, an actual value associated with the player account towards a target value at the increment rate, wherein the target value is between the minimum value and the maximum value;

responsive to the actual value reaching the target value during the gaming session, causing, by the at least one processor, a first award to be provided;

responsive to a second award condition being met, causing, by the at least one processor, a second different award to be provided, wherein the second award condition being met depends on the first award having been provided responsive to removal of the player-tracking card from the card reader, sending, by the at least one processor, a card out signal to the server to enable the server to terminate the gaming session.

12. The method of claim 11, wherein the first award includes a qualification to win the second award.

13. The method of claim 12, wherein the second award condition is met when a designated period has passed after the first award has been provided and another gaming session is initiated based on receipt of the player-tracking card by the card reader.

14. The method of claim 13, which includes randomly determining, by the at least one processor, an amount of the second award.

15. The method of claim 14, wherein the second award includes one or more promotional credits.

16. The method of claim 11, wherein the first award includes an opportunity to win a drawing ticket.

17. The method of claim 16, which includes, after the opportunity win the drawing ticket has been provided, determining, by the at least one processor, whether to cause the drawing ticket to be provided based on a random determination.

18. The method of claim 17, wherein the second award condition is met when one of the player's drawing tickets is randomly selected during a drawing.

19. The method of claim 11, wherein the first award includes associating one of a plurality of spots of a game board with the player.

20. The method of claim 19, wherein the second award condition is met when the spot associated with the player is randomly selected during game play.

* * * * *